US011914023B2

(12) United States Patent
Wang et al.

(10) Patent No.: US 11,914,023 B2
(45) Date of Patent: Feb. 27, 2024

(54) SYSTEM AND METHOD FOR TRACKING AN EXPANDED STATE OF A MOVING OBJECT USING A COMPOUND MEASUREMENT MODEL

(71) Applicant: Mitsubishi Electric Research Laboratories, Inc., Cambridge, MA (US)

(72) Inventors: Pu Wang, Cambridge, MA (US); Gang Yao, Storrs, CT (US); Hassan Mansour, Boston, MA (US); Karl Berntorp, Newton, MA (US); Petros Boufounos, Winchester, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 456 days.

(21) Appl. No.: 17/308,220

(22) Filed: May 5, 2021

(65) Prior Publication Data
US 2022/0373671 A1     Nov. 24, 2022

(51) Int. Cl.
  *G01S 13/62*   (2006.01)
  *G01S 7/41*    (2006.01)
  *G01S 13/93*   (2020.01)
  *G01S 13/931*  (2020.01)

(52) U.S. Cl.
  CPC .............. *G01S 13/62* (2013.01); *G01S 7/418* (2013.01); *G01S 13/931* (2013.01)

(58) Field of Classification Search
  None
  See application file for complete search history.

(56) References Cited

U.S. PATENT DOCUMENTS

| 10,026,015 | B2 * | 7/2018 | Cavusoglu | ........... G06V 10/763 |
| 11,124,196 | B2 * | 9/2021 | Ahn | ...................... B60W 60/00 |
| 11,619,494 | B2 * | 4/2023 | Wang | .................... G01S 13/726 |
| | | | | 701/300 |

(Continued)

OTHER PUBLICATIONS

Liang et al., "Real-Time Long-Term Tracking With Prediction-Detection-Correction", May 2017, IEEE Transactions on Multimedia, vol. 20, No. 9, Sep. 2018. (Year: 2017).*

(Continued)

*Primary Examiner* — Mohammad Ali
*Assistant Examiner* — Kelvin Booker
(74) *Attorney, Agent, or Firm* — Gene Vinokur

(57) ABSTRACT

A tracking system for tracking an expanded state of an object is provided. The tracking system comprises at least one processor and a memory having instructions stored thereon that, when executed by the at least one processor, cause the tracking system to execute a probabilistic filter that iteratively tracks a belief on the expanded state of the object, wherein the belief is predicted using a motion model of the object and is further updated using a compound measurement model of the object. The compound measurement model includes multiple probabilistic distributions constrained to lie on a contour of the object with a predetermined relative geometrical mapping to the center of the object. Further, the tracking system tracks the expanded state of the object based on the updated belief on the expanded state.

16 Claims, 18 Drawing Sheets

(56) References Cited

U.S. PATENT DOCUMENTS

| | | | | |
|---|---|---|---|---|
| 2015/0279031 A1* | 10/2015 | Cavusoglu | ............ | G06T 7/277 |
| | | | | 382/103 |
| 2021/0001868 A1* | 1/2021 | Ahn | ........................ | G06N 5/01 |
| 2021/0254982 A1* | 8/2021 | Wang | ..................... | G01C 21/28 |
| 2021/0264173 A1* | 8/2021 | Wang | ..................... | G06N 20/00 |
| 2022/0101019 A1* | 3/2022 | Cohen | ....................... | G06T 7/20 |
| 2023/0135987 A1* | 5/2023 | Wang | ..................... | G01S 13/42 |
| | | | | 701/104 |

OTHER PUBLICATIONS

Song et al., "Point target probabilistic multiple hypothesis tracking", Aug. 2010, IET Radar Sonar Navig., 2011, vol. 5, Iss. 6, pp. 632-637. (Year: 2010).*

Shan et al., "Probabilistic Long-Term Vehicle Motion Prediction and Tracking in Large Environments", Jun. 2012, IEEE Transactions on Intelligent Transportation Systems, vol. 14, No. 2, Jun. 2013. (Year: 2012).*

Wang et al., "Motion Prediction in Visual Object Tracking", Oct. 2020, 2020 IEEE/RSJ International Conference on Intelligent Robots and Systems (IROS). (Year: 2020).*

Krieg et al., "Multi-Sensor, Probabilistic Multi-Hypothesis Tracking", Nov. 1996, Proceeding of 1st Australian Data Fusion Symposium. (Year: 1996).*

Gindele et al., "Bayesian Occupancy Grid Filter for Dynamic Environments Using Prior Map Knowledge", 2009 IEEE. (Year: 2009).*

Yao et al. Extended object tracking with aotomotive radar using b spline chained ellipses model. XP03395494, IEEE Int. Conf. on Acoustics, Speech and Signal Processing (ICASSP), 2021.

* cited by examiner

SYSTEM AND METHOD FOR TRACKING AN EXPANDED STATE OF A MOVING OBJECT USING A COMPOUND MEASUREMENT MODEL

TECHNICAL FIELD

The present disclosure relates generally to automotive object tracking, and more specifically to a system and a method for tracking an expanded state of an object using measurements of the object.

BACKGROUND

Control systems employed by vehicles, such as autonomous vehicles and semi-autonomous vehicles, predict safe motion or path for the vehicles to avoid collision with obstacles, such as other vehicles or pedestrians. In some scenarios, a vehicle is also configured for sensing its surroundings, such as road edges, pedestrians, and other vehicles, with the help of one or more sensors of the vehicle. Some of these sensors include ultrasonic sensors, cameras, and LIDAR sensors, which are used in existing advanced driver assistance systems (ADAS).

The control system of the vehicle tracks an object state of the other vehicles (where the object state includes kinematic states) based on automotive radar measurements, to control the vehicle. Extended object tracking (EOT) with multiple measurements per scan has shown improved object tracking than the traditional point object tracking which includes only one measurement per scan, by augmenting the object state from kinematic-only state to both kinematic and extended states. The extended state provides dimension and orientation of the objects under tracking. To achieve this, spatial distribution (i.e. how automotive radar measurements are spatially distributed around the object) needs to be captured along with sensor noise. Current methods include a framework of a fixed set of points on a rigid body that requires a non-scalable data association between the fixed set of points and automotive radar detections even for a single object tracking. Spatial models, such as the contour model and surface model, bypass the cumbersome data association step.

For automotive radar measurements, the contour model reflects the measurement distribution along the contour of an object (e.g., the rigid body), and the surface model assumes the radar measurements are generated from the inner surface of a two-dimensional shape. Examples of the contour model include a simple rectangular shape and a more general star-convex shape modeled by either a random hypersurface model or a Gaussian process model. Some surface models such as Gaussian-based ellipse and hierarchical Gaussian-based ellipse model are computationally much simpler than the contour model that requires much more degrees of freedom to describe a more complex shape. However, the measurements of the object are subject to noise, and reflections are received only from the surface of the object. Therefore, the aforementioned models don't capture real-world automotive radar measurements.

Accordingly, there is a need for a system and a method for tracking both the kinematic and extended states of the object by capturing the real-world automotive radar measurements.

SUMMARY

It is an object of some embodiments to provide a system and a method for tracking an expanded state of an object. The expanded state of the object includes a kinematic state indicative of one or a combination of a position and a velocity of a center of the object, and an extended state indicative of one or a combination of a dimension and an orientation of the object. The center of the object is one or a combination of an arbitrarily selected point, a geometrical center of the object, a center of gravity of the object, a center of a rear axis of wheels of a vehicle, and the like. A sensor, for example, automotive radar, is used to track objects (such as a vehicle). In an embodiment, the automotive radar may provide direct measurements of radial velocities, long operating ranges, small sizes at millimeter or sub-terahertz frequency bands, and high spatial resolutions.

In point object tracking, a single measurement per scan is received from the vehicle. The point object tracking provides only the kinematic state (position) of the vehicle. Further, a probabilistic filter with a measurement model having distribution of kinematic states is utilized to track the vehicle. In extended object tracking (EOT), multiple measurements per scan are received. The multiple measurements are spatially structured around the vehicle. The extended object tracking provides both the kinematic and the extended state of the vehicle. The probabilistic filter with a measurement model having distribution of extended states is utilized to track the vehicle.

However, real-world automotive radar measurement distributions show that multiple reflections from the vehicle are complex. Due to this complexity, designing a proper measurement model becomes complex. Therefore, regular measurement models are applicable only for the kinematic state and not for the expanded state.

To that end, in some embodiments, spatial models such as a contour model and a surface model are used to capture the real-world automotive radar measurements. However, the aforesaid spatial models are inaccurate. Some embodiments are based on the recognition that real-world automotive radar measurements are distributed around edges or the surface of the objects (the vehicle) with a certain volume, which gives rise to a surface volume model. To that end, some embodiments are based on the objective of formulating a surface volume model that resembles and captures the real-world automotive radar measurements. The surface volume model balances between the contour model and the surface model with more realistic features while keeping the EOT accurate.

In particular, in an embodiment, based on principles of the contour model and the surface model, a compound measurement model (which is a type of surface volume model) is determined. The compound measurement model includes multiple probabilistic distributions constrained to lie on a contour of the object with a predetermined relative geometrical mapping to the center of the object. The multiple probabilistic distributions are used to cover a measurement spread along the contour of the object.

The compound measurement model is compound in multiple ways. For example, the compound measurement model has a compound structure, i.e., the multiple probabilistic distributions. Also, the compound measurement model has a compound composition, i.e., functions of the multiple probabilistic distributions, a function of the contour, and their relationship. Further, the compound measurement model has a compound nature, i.e., the multiple probabilistic distributions are based on the measurements and thus represent data-driven approaches of model generation, whereas the contour is based on modeling a shape of the object, e.g., a shape of a vehicle, using principles of physics-based modeling.

Additionally, the compound measurement model takes advantage of different principles of modeling the expanded state, i.e., the compound measurement model joins the principles of the contour model and the surface model. As a result, the compound measurement model better represents the physical nature of tracking the object while simplifying measurement assignment. In addition, the multiple probabilistic distributions of the compound measurement model are more flexible over a single distribution of the surface model, and can better describe the contour of the object, and are more flexible to explain the measurements coming from different angles or views of the object.

Some embodiments are based on understanding that, in theory, the multiple probabilistic distributions can lie on the contour, assuming that a shape of the contour has no restrictions. However, in practice, such assumptions are incorrect for tracking the expanded state. In contrast, the contour of the object is predetermined and the multiple probabilistic distributions are fit to the contour rather than the contour is fit to the multiple probabilistic distributions.

The compound measurement model is learned offline, i.e., in advance. The compound measurement model may be learned in a unit coordinate system or a global coordinate system. Some embodiments are based on recognition that it is beneficial to learn the compound measurement model in the unit coordinate system, because it simplifies the calculation and makes the compound measurement model agnostic to the dimensions of the object. Each of the multiple probabilistic distributions (represented as ellipses) can be assigned with measurements in a probabilistic manner. The measurements associated with the ellipse may be referred to as ellipse-assigned measurements.

According to some embodiments, the offline learned compound measurement model is used for online tracking of the expanded state of the object, i.e., real time tracking of the expanded state of the object. Some embodiments are based on the realization that the probabilistic nature of the compound measurement model can be beneficially aligned with probabilistic multi-hypothesis tracking (PMHT) methods. For example, such an alignment allows implementing the probabilistic filter using at least a variation of a Kalman filter. For example, one embodiment uses an unscented Kalman filter-probabilistic multi-hypothesis tracking (UKF-PMHT) method. The unscented Kalman filter (UKF) is used for transforming the compound measurement model from the unit coordinate system into the global coordinate system. The probabilistic multi-hypothesis tracking (PMHT) method is then applied to assign measurements at a current time step to different probabilistic distributions in a probabilistic fashion, and update the expanded state of the object.

According to an embodiment, given an expanded state of the object and a covariance matrix corresponding to a previous time step, and a motion model of the object, an expanded state of the object for a current time step and a covariance matrix corresponding to the expanded state can be predicted. In an embodiment, the motion model may be a coordinated turn (CT) motion model with polar velocity. In some other embodiments, for the kinematic states, the coordinated turn (CT) motion model with polar velocity is used and, for the extended state, i.e., length and width, a constant model is used with a process noise with a small covariance as the length and width are unlikely changed over time. The predicted expanded state of the object may be referred to as a predicted belief of the expanded state because this prediction is probabilistic. Some embodiments are based on recognition that the predicted expanded state of the object may be inaccurate. To correct the predicted expanded state of the object, the compound measurement model in a unit coordinate system is used. However, the predicted expanded state is in a global coordinate system. Therefore, to align the compound measurement model in the unit coordinate system with the predicted expanded state, the compound measurement model needs to be transformed from the unit coordinate system to the global coordinate system. In particular, the ellipse-assigned measurements in the unit coordinate system need to be transformed into the global coordinate system.

Some embodiments are based on realization that such a transformation can be achieved using an unscented transform function (or UKF). To that end, in an embodiment, sigma points are generated for an ellipse (i.e., for a probabilistic distribution of the compound measurement model). The "ellipse" and "probabilistic distribution" may be used interchangeably and would mean the same. Further, the sigma points are propagated into the unscented transform function and, consequently, predicted measurements in the global coordinate system corresponding to the ellipse-assigned measurements of the ellipse in the unit coordinate system is determined. Additionally, a covariance matrix corresponding to the predicted measurements is determined based on the predicted measurements. Likewise, the measurements in the global coordinate system corresponding to the ellipse-assigned measurements associated with the rest of the ellipses are determined. To that end, a predicted expanded state model, where the compound measurement model is aligned according to the predicted expanded state, is obtained.

Further, the measurements at the current time step are received. Some embodiments are based on the realization that the multiple probabilistic distributions (ellipses) can be treated independently of each other. Such an independent treatment allows considering different view-angles for probing the expanded state of the object. To consider such an independent treatment, some embodiments treat different probabilistic distributions of the multiple probabilistic distributions as belonging to different objects. Additionally, some embodiments are based on the realization that a soft probabilistic assignment, i.e., probabilistic assignment of the measurements to different probabilistic distributions, is more advantageous than a hard deterministic assignment. To that end, the measurements are assigned to each probabilistic distribution with a corresponding association probability. The measurements with the corresponding association probability associated with each probabilistic distribution are referred to as the 'synthetic measurements'.

Further, in some embodiments, a synthetic centroid and a synthetic covariance matrix are determined for each probabilistic distribution based on the corresponding synthetic measurements. Further, using the synthetic measurements associated with each probabilistic distribution, the predicted belief on the expanded state is updated. For instance, the predicted belief on the expanded state may be updated using the probabilistic filter, such as the Kalman filter, with the synthetic measurements associated with each probabilistic distribution to produce an updated expanded state of the object.

Accordingly, one embodiment discloses a tracking system for tracking an expanded state of an object including a kinematic state indicative of a combination of a position and a velocity of a center of the object and an extended state indicative of a combination of a dimension and an orientation of the object. The tracking system comprises: at least one processor; and memory having instructions stored thereon that, when executed by the at least one processor, cause the tracking system to receive measurements associated with at least one sensor, wherein at least one sensor is configured to probe a scene including the object with one or multiple signal transmissions to produce one or multiple measurements of the object per the transmission; execute a probabilistic filter iteratively tracking a belief on the expanded state of the object, wherein the belief is predicted using a motion model of the object and is updated using a compound measurement model of the object, wherein the compound measurement model includes multiple probabilistic distributions constrained to lie on a contour of the object with a predetermined relative geometrical mapping to the center of the object, wherein in each iteration of the iterative tracking, the belief on the expanded state is updated based on a difference between a predicted belief and an updated belief, wherein the updated belief is estimated based on probabilities of the measurements fitting each of the multiple probabilistic distributions, and mapped to the expanded state of the object based on the corresponding geometrical mapping; and track the expanded state of the object based on the updated belief on the expanded state.

Accordingly, another embodiment discloses a tracking method for tracking an expanded state of an object including a kinematic state indicative of one or a combination of a position and a velocity of a center of the object and an extended state indicative of one or a combination of a dimension and an orientation of the object. The tracking method comprises receiving measurements associated with at least one sensor, wherein at least one sensor is configured to probe a scene including the object with one or multiple signal transmissions to produce one or multiple measurements of the object per the transmission; executing a probabilistic filter iteratively tracking a belief on the expanded state of the object, wherein the belief is predicted using a motion model of the object and updated using a compound measurement model of the object, wherein the compound measurement model includes multiple probabilistic distributions constrained to lie on a contour of the object with a predetermined relative geometrical mapping to the center of the object, wherein in each iteration of the iterative tracking, the belief on the expanded state is updated based on a difference between a predicted belief and an updated belief, wherein the updated belief is estimated based on probabilities of the measurements fitting each of the multiple probabilistic distributions, and mapped to the expanded state of the object based on the corresponding geometrical mapping; and tracking the expanded state of the object based on the updated belief on the expanded state.

A non-transitory computer readable storage medium embodied thereon a program executable by a processor for performing a method for tracking an expanded state of an object, wherein the expanded state includes a kinematic state indicative of one or a combination of a position and a velocity of a center of the object and an extended state indicative of one or a combination of a dimension and an orientation of the object. The method comprises receiving measurements associated with at least one sensor, wherein at least one sensor is configured to probe a scene including the object with one or multiple signal transmissions to produce one or multiple measurements of the object per the transmission; executing a probabilistic filter iteratively tracking a belief on the expanded state of the object, wherein the belief is predicted using a motion model of the object and is updated using a compound measurement model of the object, wherein the compound measurement model includes multiple probabilistic distributions constrained to lie on a contour of the object with a predetermined relative geometrical mapping to the center of the object, wherein in each iteration of the iterative tracking, the belief on the expanded state is updated based on a difference between a predicted belief and an updated belief, wherein the updated belief is estimated based on probabilities of the measurements fitting each of the multiple probabilistic distributions, and mapped to the expanded state of the object based on the corresponding geometrical mapping; and tracking the expanded state of the object based on the updated belief on the expanded state.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
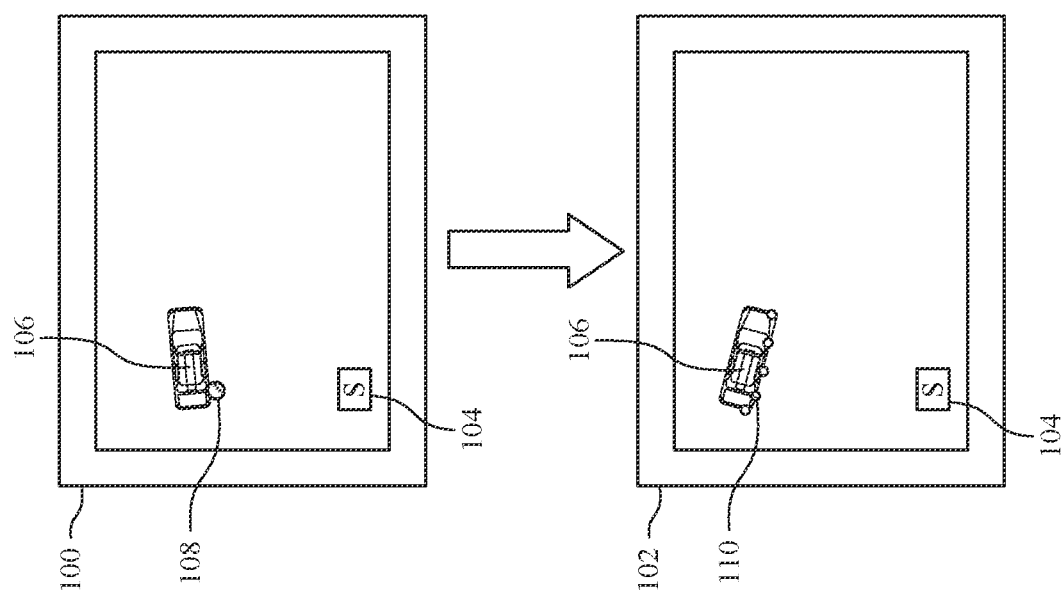
FIGS. 1A, 1B and 1C collectively show a schematic overview of principles for tracking an expanded state of an object, according to some embodiments.
Figure 1B:
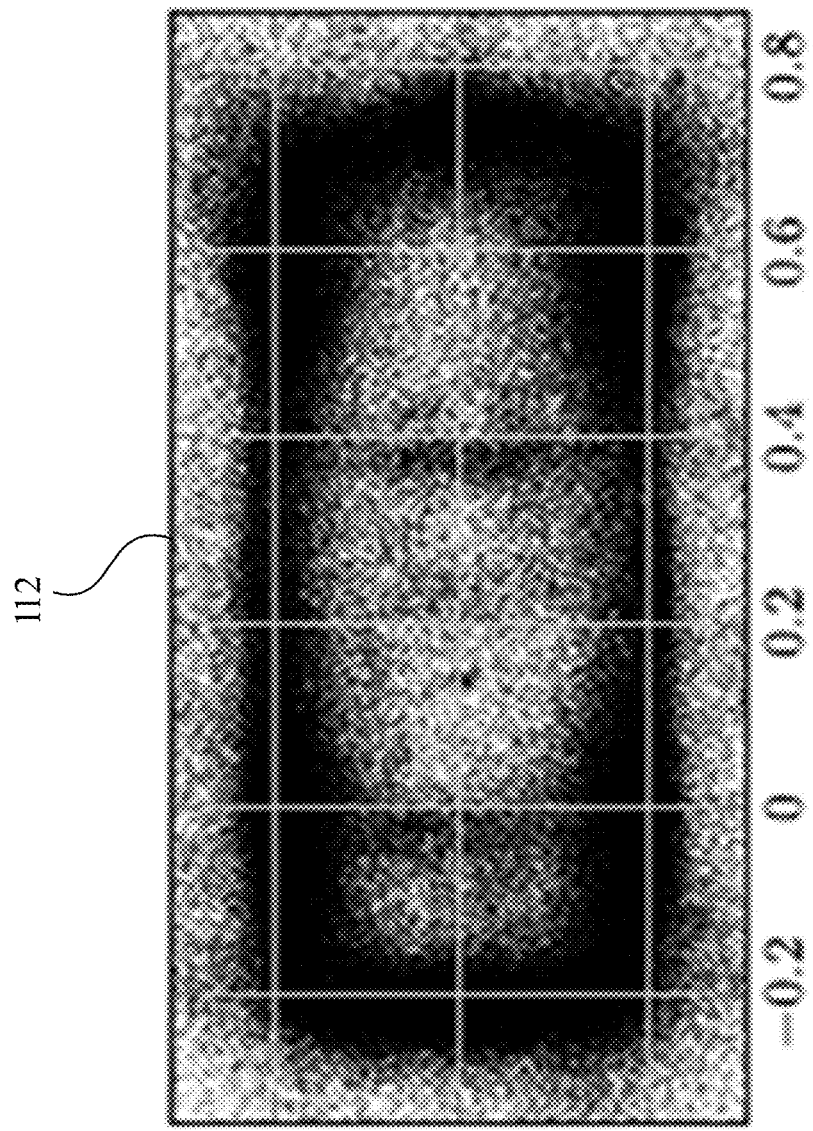
Figure 1C:
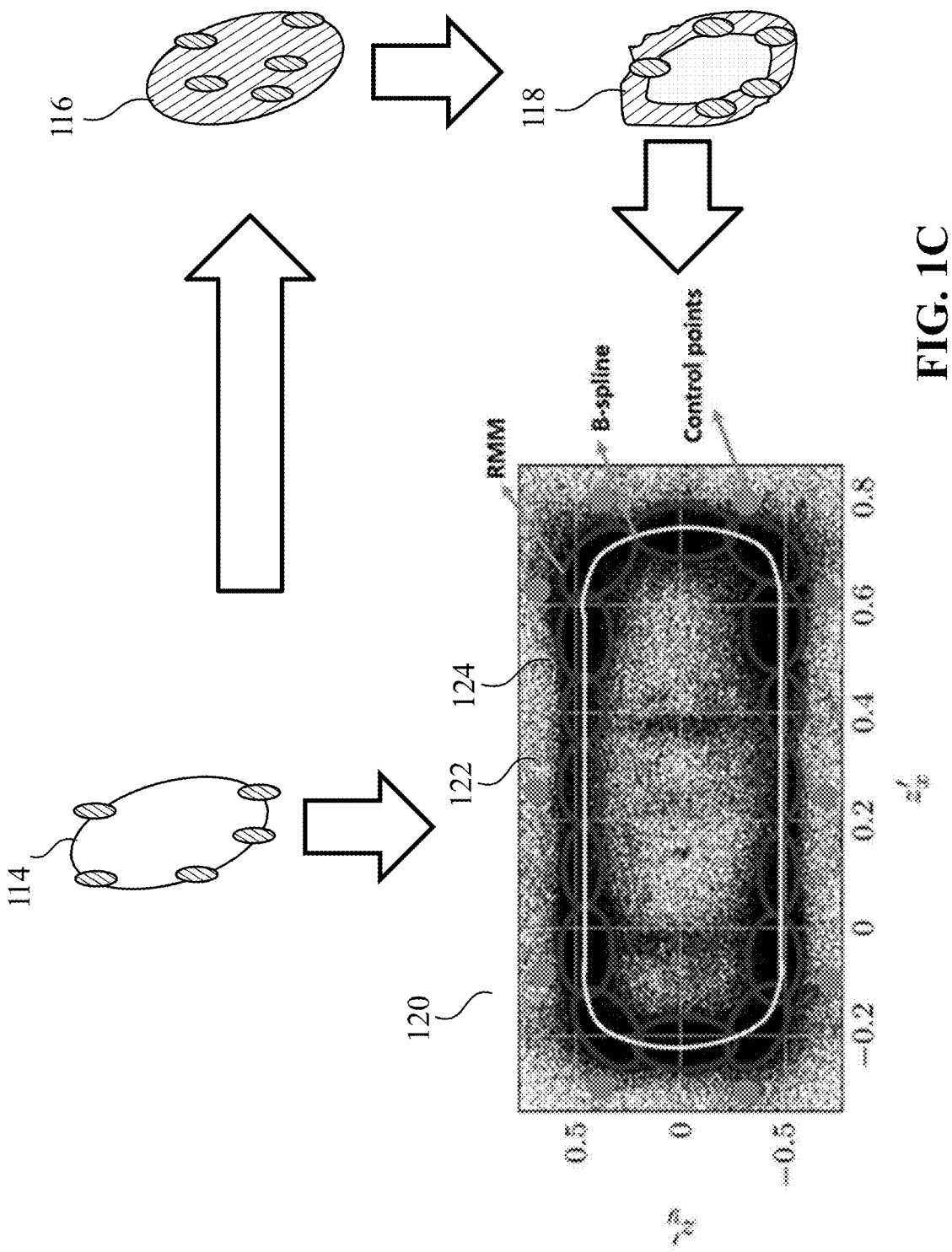

FIGS. 1A, 1B and 1C show a schematic overview of some principles used by some embodiments for tracking an expanded state of an object. The expanded state of the object includes a kinematic state indicative of one or a combination of a position and a velocity of a center of the object, and an extended state indicative of one or a combination of a dimension and an orientation of the object. The center of the object is one or a combination of an arbitrarily selected point, a geometrical center of the object, a center of gravity of the object, a center of a rear axis of wheels of a vehicle, and the like. A sensor 104 (for example, automotive radar) is used to track objects (such as vehicle 106). In point object tracking 100, a single measurement 108 per scan is received from the vehicle 106. The point object tracking 100 provides only the kinematic state (position) of the vehicle 106. Further, a probabilistic filter with a measurement model having distribution of kinematic states is utilized to track the vehicle 106. In extended object tracking (EOT) 102, multiple measurements 110 per scan are received. The multiple measurements 110 are spatially structured around the vehicle 106. The EOT 102 provides both the kinematic and the extended state of the vehicle 106. The probabilistic filter with a measurement model having distribution of extended states is utilized to track the vehicle 106.

However, real-world automotive radar measurement 112 distributions, as illustrated in FIG. 1B, show that multiple reflections from the vehicle 106 are complex. Due to this complexity, designing of the measurement model becomes complex. Therefore, regular measurement models are applicable only for the kinematic state and not for the expanded state.

To that end, in some embodiments, spatial models such as a contour model 114, as illustrated in FIG. 1C, and a surface model 116 are used to capture the real-world automotive radar measurements 112. However, the aforesaid spatial models are inaccurate. Some embodiments are based on the recognition that real-world automotive radar measurements 112 are distributed around edges of the objects (the vehicle 106) with a certain volume, which gives rise to a surface volume model. To that end, some embodiments are based on objective of formulating a surface volume model 118 that resembles and captures the real-world automotive radar measurements 112. The surface volume model 118 balances between the contour model 114 and the surface model 116 with more realistic features while keeping the EOT accurate.

In particular, in an embodiment, based on principles of the contour model 114 and the surface model 116, a compound measurement model 120 (which is a type of surface volume model) is determined. The compound measurement model 120 includes multiple probabilistic distributions 122 that are geometrically constrained to a contour 124 of the object. In FIG. 1C, this geometrical constraint is that the centers of multiple probabilistic distributions lies on the contour. The compound measurement model then has a predetermined relative geometrical mapping to the center of the object. The multiple probabilistic distributions 122 are used to cover a measurement spread along the contour 124 of the object.

The compound measurement model 120 is compound in multiple ways. For example, the compound measurement model 120 has a compound structure, i.e., the multiple probabilistic distributions 122. Also, the compound measurement model 120 has a compound composition, i.e., functions of the multiple probabilistic distributions 122, a function of the contour 124, and their relationship. Further, the compound measurement model 120 has a compound nature, i.e., the multiple probabilistic distributions 122 are based on measurements and thus represent data-driven approaches of model generation, whereas the contour 124 is based on modeling a shape of the object, e.g., a shape of a vehicle, using principles of physics-based modeling.

Additionally, the compound measurement model 120 takes advantage of different principles of modeling the expanded state, i.e., the compound measurement model 120 joins the principles of the contour model 114 and the surface model 116. As a result, the compound measurement model 120 better represents a physical nature of tracking of the object while simplifying measurement assignment. In addition, the multiple probabilistic distributions 122 of the compound measurement model 120 are more flexible over a single distribution of the surface model 116, and may be configured to better describe the contour 124, and are further more flexible to explain the measurements coming from different angles or views of the object.

Some embodiments are based on understanding that, in theory, the multiple probabilistic distributions 122 can lie on the contour 124, assuming that a shape of the contour 124 has no restrictions. However, in practice, such assumptions are incorrect and useless for tracking the expanded state. In contrast, the contour 124 of the object is predetermined and the multiple probabilistic distributions 122 are fit to the contour 124 rather than the contour 124 is fit to the multiple probabilistic distributions 122. This allows reflecting a physical structure of the object during an update stage of the probabilistic filter.

The compound measurement model 120 is learned offline, i.e., in advance. The compound measurement model 120 may be learned in a unit coordinate system or a global coordinate system. Some embodiments are based on recognition that it is beneficial to learn the compound measurement model 120 in the unit coordinate system, because it simplifies calculation and makes the compound measurement model 120 agnostic to the dimensions of the object. Each of the multiple probabilistic distributions 122 (represented as ellipses) can be assigned with measurements in a probabilistic manner. The measurements associated with the ellipse may be referred to as ellipse-assigned measurements.

Some embodiments are based on a recognition that the expanded state of the object can be tracked online, i.e., in real-time, using the compound measurement model 120. Specifically, various embodiments track the expanded state of the object using the probabilistic filter that tracks a belief on the expanded state of the object, wherein the belief on the expanded state of the object is predicted using a motion model of the object and is updated using the compound measurement model 120 of the object.

Figure 2:
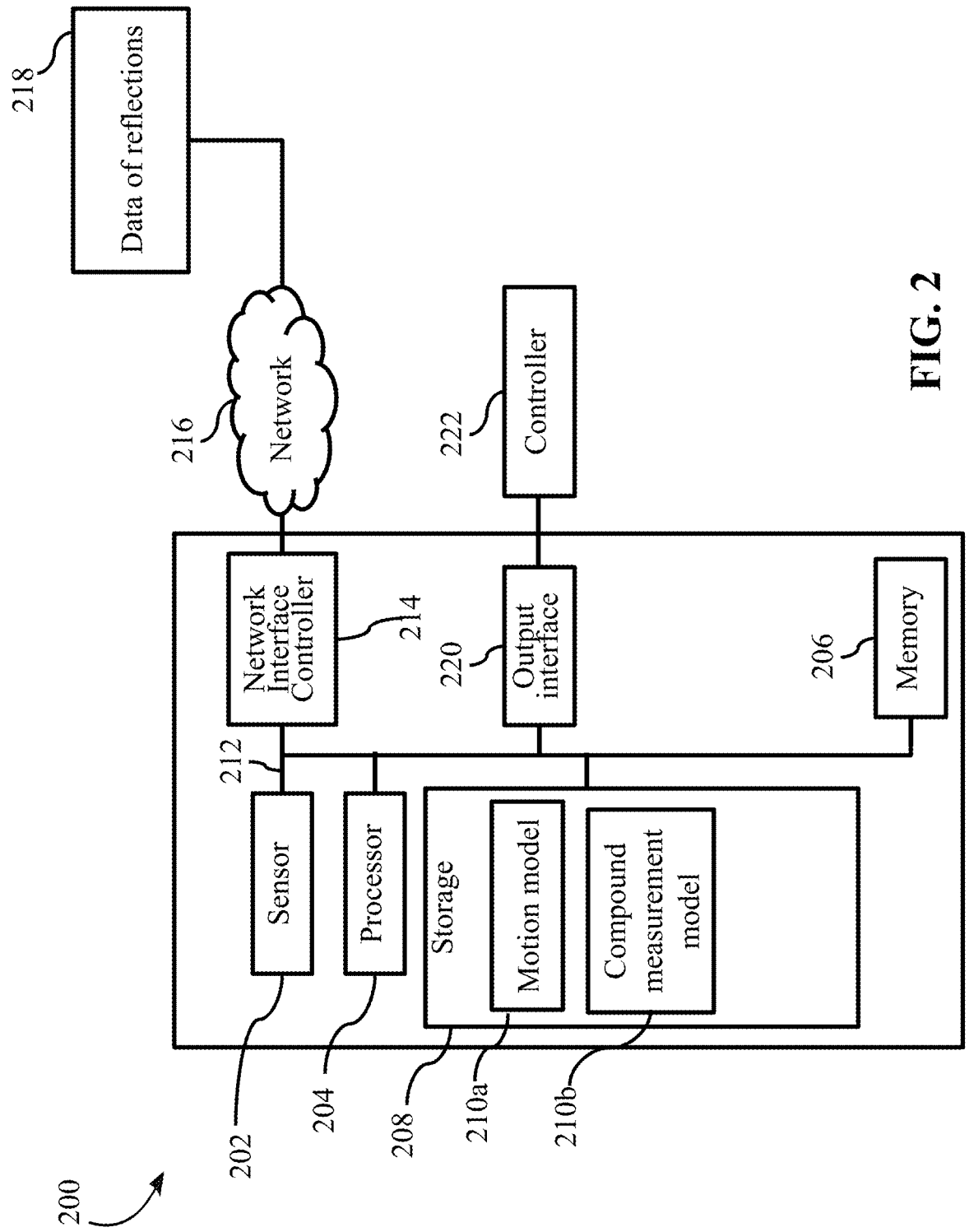
FIG. 2 shows a block diagram of a tracking system for tracking the expanded state of the object, according to some embodiments.

FIG. 2 shows a block diagram of a tracking system 200 for tracking the expanded state of the object by using the compound measurement model 120 (shown in previous figures), according to some embodiments. The object may be a vehicle, such as, but not limited to, a car, bike, bus, or truck. Also, the vehicle may be an autonomous or a semi-autonomous vehicle. The expanded state includes the kinematic state and the extended state of the object. According to some embodiments, the kinematic state corresponds to motion parameters of the object, such as velocity, acceleration, heading and turn-rate. In some other embodiments, the kinematic state corresponds to the position of the object with its motion parameters. The tracking system 200 may include a sensor 202 or be operatively connected to a set of sensors to probe a scene with one or multiple signal transmissions. The one or multiple signal transmissions in turn are configured to produce one or multiple measurements of the object per transmission. According to some embodiments, the sensor 202 may be the automotive radar. In some embodiments, the scene includes a moving object. In some other embodiments, the scene may include one or more objects that include both moving objects and stationary objects.

The tracking system 200 can have a number of interfaces connecting the tracking system 200 with other systems and devices. For example, a network interface controller (NIC) 214 is adapted to connect the tracking system 200 through a bus 212 to a network 216 connecting the tracking system 200 with a set of sensors. Through the network 216, either wirelessly or through wires, the tracking system 200 receives data of reflections of the one or multiple signal transmissions to produce the one or multiple measurements of the object per transmission. Additionally or alternatively, the tracking system 200 includes an output interface 220 configured to submit control inputs to a controller 222.

The tracking system 200 also includes a processor 204 configured to execute stored instructions, as well as a memory 206 that stores instructions that are executable by the processor 204. The processor 204 can be a single core processor, a multi-core processor, a computing cluster, or any number of other configurations. The memory 206 can include random access memory (RAM), read only memory (ROM), flash memory, or any other suitable memory systems. The processor 204 is connected through the bus 212 to one or more input and output devices. Further the tracking system 200 includes a storage device 208 adapted to store different modules including instructions executable by the processor 204. The storage device 208 can be implemented using a hard drive, an optical drive, a thumb drive, an array of drives, or any combinations thereof.

The storage device 208 is configured to store a motion model 210a of the object and a compound measurement model 210b of the object (e.g., the compound measurement model 120). The processor 204 is configured to execute iteratively, a probabilistic filter, for iteratively tracking a belief on the expanded state of the object predicted using the motion model 210a of the object and updated using the compound measurement model 210b of the object. The tracking of the belief on the expanded state of the object is described in detail below with reference to FIGS. 3A, 3B, and 3C.

Figure 3A:
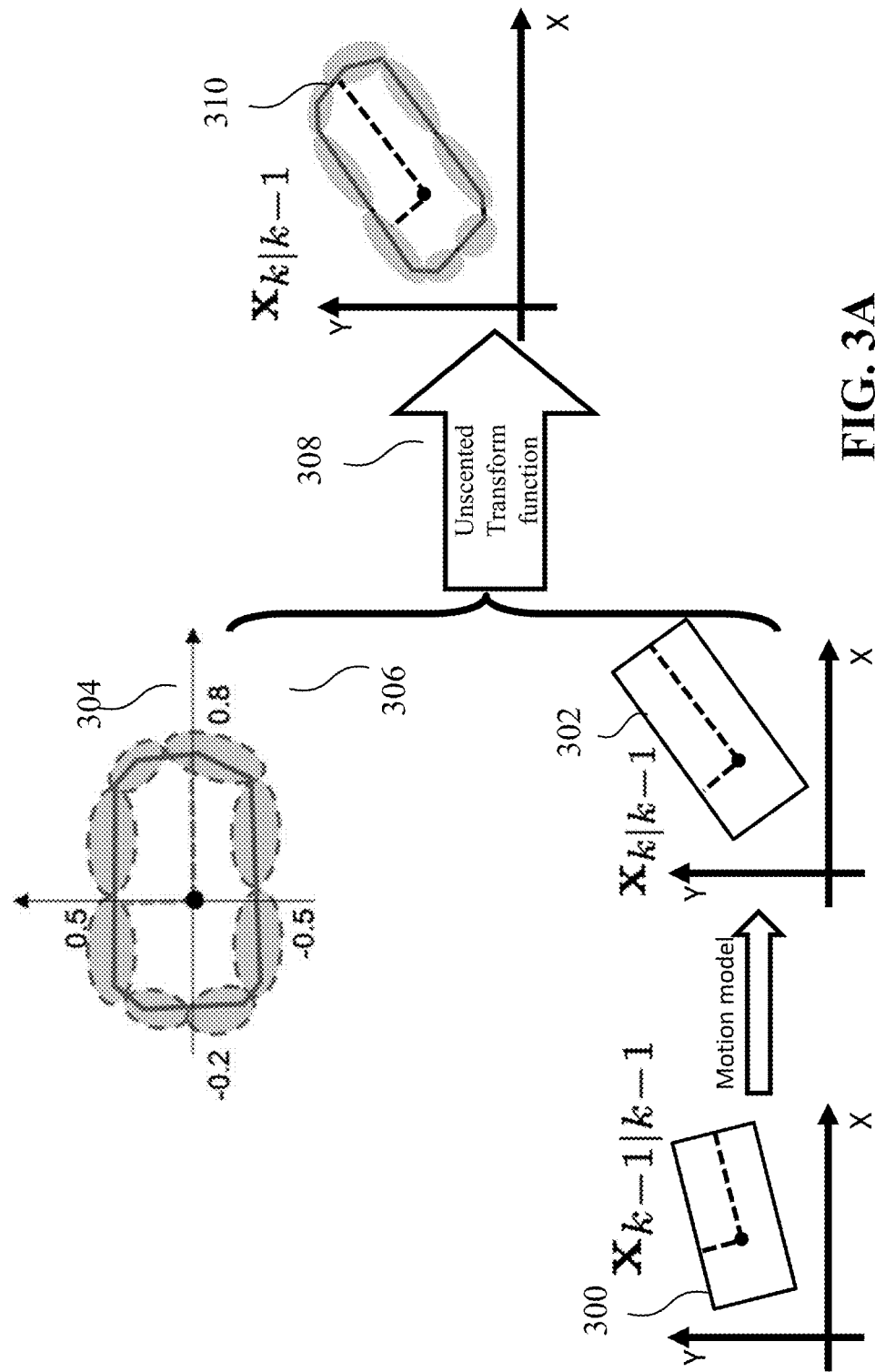
FIGS. 3A, 3B, and 3C collectively show various schematics for tracking a belief on the expanded state of the object using a compound measurement model, according to some embodiments.

FIG. 3A shows a schematic for computing predicted measurements and a covariance matrix, according to some embodiments. Given an expanded state 300 of the object and a covariance matrix corresponding to a previous time step, and a motion model of the object, an expanded state 302 of the object for a current time step and a covariance matrix corresponding to the expanded state 302 are predicted by the processor 204. The expanded state 300 of the object corresponding to the previous time step is denoted as $x_{k-1|k-1}$. The predicted expanded state 302 of the object is denoted as $x_{k|k-1}$. The expanded state 300 includes various kinematic states, for example, $x=[x_m, y_m, v, \psi, \omega]^T$, where $(x_m, y_m)^T$ is the center of the object, v is a polar velocity of the vehicle, $\psi$ is an orientation angle, and $\omega$ is a turning rate. In an alternate embodiment, the expanded state 300 includes the extended state in addition to the kinematic states, for example, $x=[x_m, y_m, v, \psi, \omega, l, w]^T$, where l and w are length and width of the object, respectively. Likewise, the predicted expanded state 302 includes predicted kinematic states and/or predicted extended states. In an embodiment, the motion model may be a coordinated turn (CT) motion model with polar velocity. In some other embodiments, for the kinematic states, the CT motion model with the polar velocity is used and, for the extended state, i.e., the length and width, a constant model is used with a process noise with a small covariance as the length and width are unlikely changed over time.

The predicted expanded state 302 of the object may be referred to as a predicted belief of the expanded state because this prediction is probabilistic. Some embodiments are based on a recognition that the predicted expanded state 302 of the object may be inaccurate to generate predicted measurement for the expanded state as it requires an accurate spatial model of automotive radar measurements. To this end, in some embodiments, the compound measurement model 304 in a unit coordinate system that is learned offline is used. To align the compound measurement model 304 in the unit coordinate system with the predicted expanded state 302, the compound measurement model 304 needs to be transformed from the unit coordinate system to the global coordinate system with respect to the predicted expanded state 302. In particular, the ellipse-assigned measurements in the unit coordinate system need to be transformed into the global coordinate system.

Some embodiments are based on realization that such a transformation can be achieved using an unscented transform function 308. To that end, in an embodiment, the processor 204 generates sigma points for an ellipse 306 (i.e., for a probabilistic distribution of the compound measurement model 304). The "ellipse" and "probabilistic distribution" may be used interchangeably and would mean the same. Further, the sigma points are propagated into the unscented transform function 308 which is a function of the predicted state 302 and, consequently, predicted measurements in the global coordinate system corresponding to the ellipse-assigned measurements of the ellipse 306 in the unit coordinate system is determined. Additionally, a covariance corresponding to the predicted measurements is determined based on the predicted measurements. Likewise, the measurements in the global coordinate system corresponding to the ellipse-assigned measurements associated with the rest of the ellipses are determined. To that end, a predicted expanded state model 310, where the compound measurement model 304 is aligned according to the predicted expanded state 302, is obtained. Further, synthetic measurements are determined for each probabilistic distribution of the predicted expanded state model 310 as described below with reference to FIG. 3B.

Figure 3B:
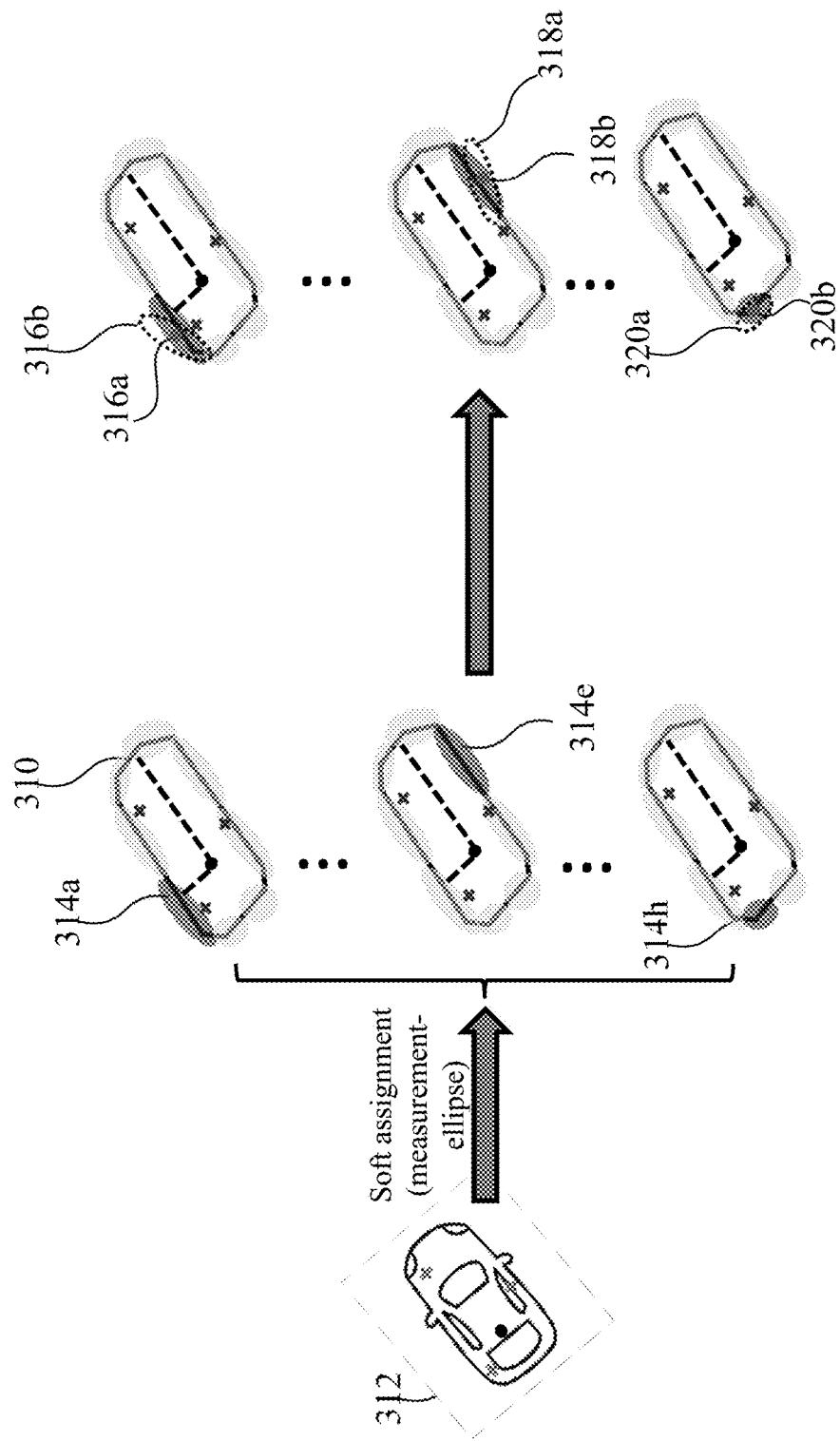

FIG. 3B shows a schematic for determining the synthetic measurements for each probabilistic distribution of the predicted expanded state model 310, according to some embodiments. The processor 204 receives measurements 312 (represented by cross marks) at the current time step. Some embodiments are based on the realization that multiple probabilistic distributions 314a-314h (ellipses) can be treated independently, e.g., parallelly to each other. Such an independent treatment allows considering different view-angles of probing the expanded state of the object. To consider such an independent treatment, some embodiments treat different probabilistic distributions of the multiple probabilistic distributions 314a-314h as belonging to different objects. Additionally, some embodiments are based on the realization that a soft probabilistic assignment, i.e., probabilistic assignment of the measurements 312 to different probabilistic distributions, is more advantageous than a hard deterministic assignment. Soft probabilistic assignment may avoid catastrophic assignment of hard assignment while keeping the association dimension linear with respect to the number of ellipses and measurements.

To that end, processor 204 assigns the measurements 312 to the probabilistic distribution 314 with an association probability. Likewise, processor 204 assigns the measurements 312 to each of the probabilistic distributions 314a-314h with a corresponding association probability. The measurements with the corresponding association probability associated with each of multiple probabilistic distributions 314a-314h is referred to as the 'synthetic measurements'.

Further, for the probabilistic distribution 314a, the processor 204 determines, based on the synthetic measurements associated with the probabilistic distribution 314a, a synthetic centroid 316a and a synthetic covariance matrix defining a spread 316b. Likewise, for the probabilistic distribution 314e, the processor 204 determines, based on the synthetic measurements associated with the probabilistic distribution 314e, a synthetic centroid 318a and a synthetic covariance matrix defining a spread 318b. Likewise, for the probabilistic distribution 314h, the processor 204 determines, based on the synthetic measurements associated with the probabilistic distribution 314h, a synthetic centroid 320a and a synthetic covariance matrix defining a spread 320b. In such a way, the synthetic centroid and the synthetic covariance matrix are determined for each probabilistic distribution. Further, using the synthetic measurements associated with each probabilistic distribution, the predicted belief on the expanded state is updated as described below with reference to FIG. 3C.

Figure 3C:
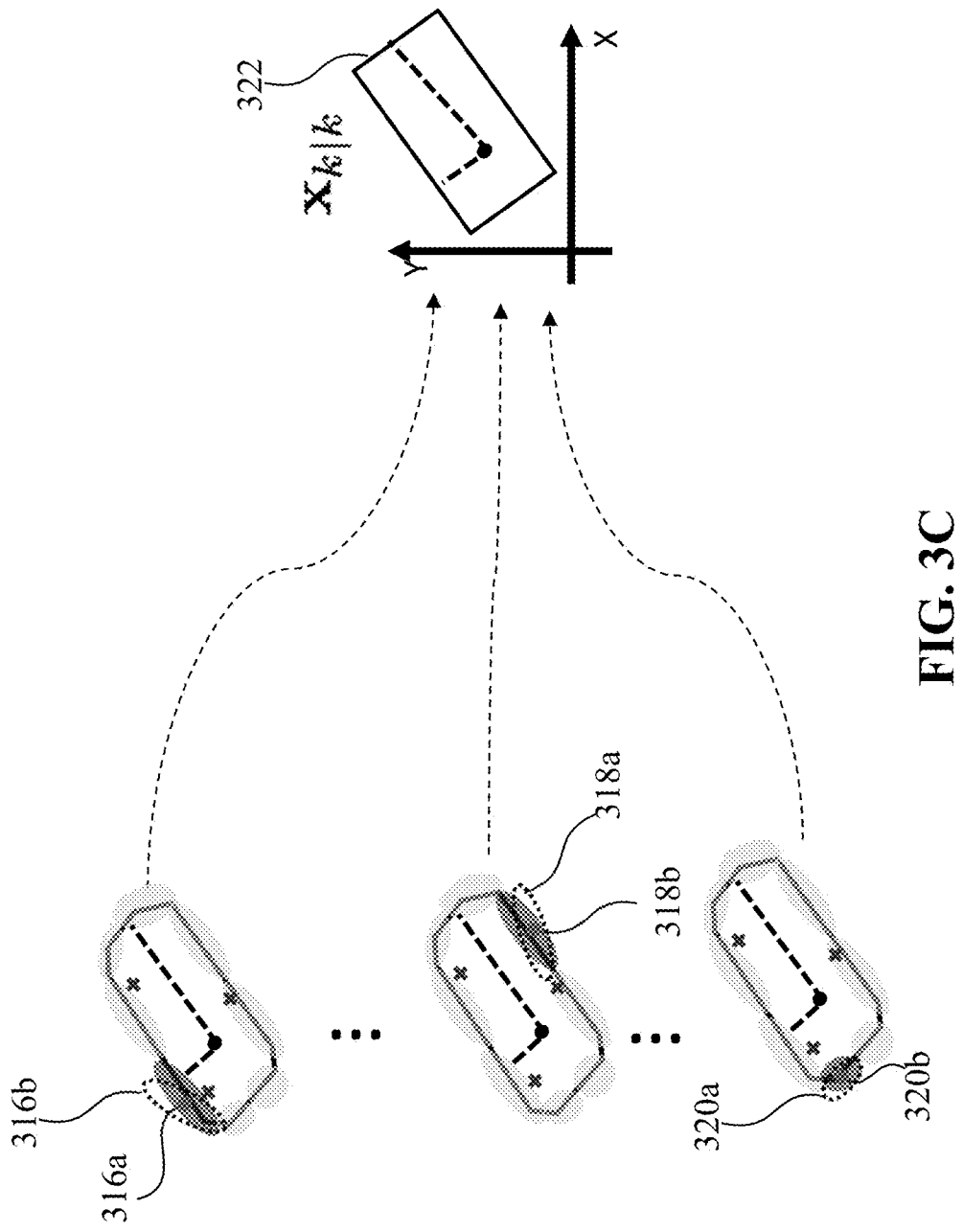

FIG. 3C shows a schematic for updating the predicted belief on the expanded state 302, according to some embodiments. The processor 204 updates the predicted belief on the expanded state 302 using the probabilistic filter, such as a Kalman filter, with the synthetic measurements associated with each probabilistic distribution to produce an updated expanded state $x_{k|k}$ 322 of the object. The updated expanded state $x_{k|k}$ 322 of the object may be referred to as an updated belief on the expanded state. Further, the updated belief on the expanded state is used to update the tracked belief. In an embodiment, the tracked belief is updated based on a difference between the predicted belief and the updated belief. Further, the processor 204 tracks the expanded state of the object based on the updated tracked belief on the expanded state.

The compound measurement model 304 used for tracking the expanded state of the object, as described above, is learned offline. The offline learning and characteristics of the compound measurement model 304 are described below.

The compound measurement model 304 includes, for instance, L Gaussian components (i.e., ellipses) with their component means located on the contour. In an embodiment, the contour may be a B-spline curve. The B-spline curve is advantageous because the B-spline curve provides more control flexibility for enclosed contours. Also, since the B-spline curves satisfy a strong convex hull property, they have a finer shape control. For each ellipse centered at $\mu_l$ with an extent $\Sigma_l$, $N_k$ measurements may be assigned with an association probability $\rho_i^l$. Given a measurement-to-ellipse assignment, a likelihood function is given as $$\phi(z_k \mid N_l, \mu_l, \Sigma_l, \rho^l) \propto \mathcal{N}\left(\bar{z}_l, \mu_l, \frac{\Sigma_l}{N_l}\right) \times \mathcal{W}(\bar{Z}_l; \bar{N}_l - 1, \Sigma_l)$$

where $\bar{N}_l = \sum_{i=1}^{N_k} \rho_i^l$, $$\bar{z}_l = \frac{\sum_{i=1}^{N_k} \rho_i^l z_i}{\sum_{i=1}^{N_k} \rho_i^l}, \quad (1)$$

$$\bar{Z}_l = \sum_{i=1}^{N_k} \rho_i^l (z_i - \bar{z}_l)(z_i - \bar{z}_l)^T, \quad (2)$$

(1) and (2) correspond to a sample mean and spread of l-th ellipse. $\mathcal{N}$ denotes a Gaussian distribution and $\mathcal{W}$ is a Wishart distribution.

Some embodiments are based on recognition that the probabilistic distributions of the compound measurement model 304 can be represented using Gaussian distribution to better align with probabilistic filters. For example, in some embodiments, the probabilistic distributions are defined as a random matrix model (RMM) in a probability space $(\Omega, P, F)$ where the sample space $\Omega$ is a set of matrices. The random matrices are advantageous to represent multi-dimensional probabilistic distributions and parameters of the probabilistic distributions represented as RMMs can be illustrated using oval shapes. According to an embodiment, with all L ellipses and given the measurement-to-ellipse assignment, L random matrices model is defined as $$p(Z \mid \theta, \rho) = \sum_{l=1}^{L} \pi_l \phi(Z_k \mid N_l, \mu_l, \Sigma_l, \rho), \quad (3)$$

where mixture weights $\pi_l$ are assumed to equal $\pi_l = 1/L$.

Further, it is assumed that the ellipse centers are located on a B-spline curve defined by $c(r) \in \mathbb{R}^{2 \times 1}$ of degree d $$c(r) = \sum_{j=0}^{m} p_j B_{j,d}(r), \quad 0 \le r \le m - d + 1, \quad (4)$$

where $p_j \in \mathbb{R}^{2 \times 1}$ is a j-th control point, m+1 is a number of control points, and $B_{j,d}(r)$ is a basis function with a parameter r. By enforcing $\mu_l = c(r_l)$ with $r_l$ denoting a corresponding parameter of the l-th ellipse center $\mu_l$, a B-spline chained ellipses model (i.e., the compound measurement model 304) is defined as $$p(Z \mid \theta, \rho) = \sum_{l=1}^{L} \pi_l \phi(Z_l \mid N_l, c(r_l), \Sigma_l, \rho), \quad (5)$$

where parameters of the B-spline chained ellipses model (i.e., the compound measurement model 304) are a number of measurements for each component N, the control points of the B-spline curve $\{p_j\}_{j=0}^{m}$ and the covariance matrices of each component $\{\Sigma_l\}_{l=1}^{L}$.

Figure 4:
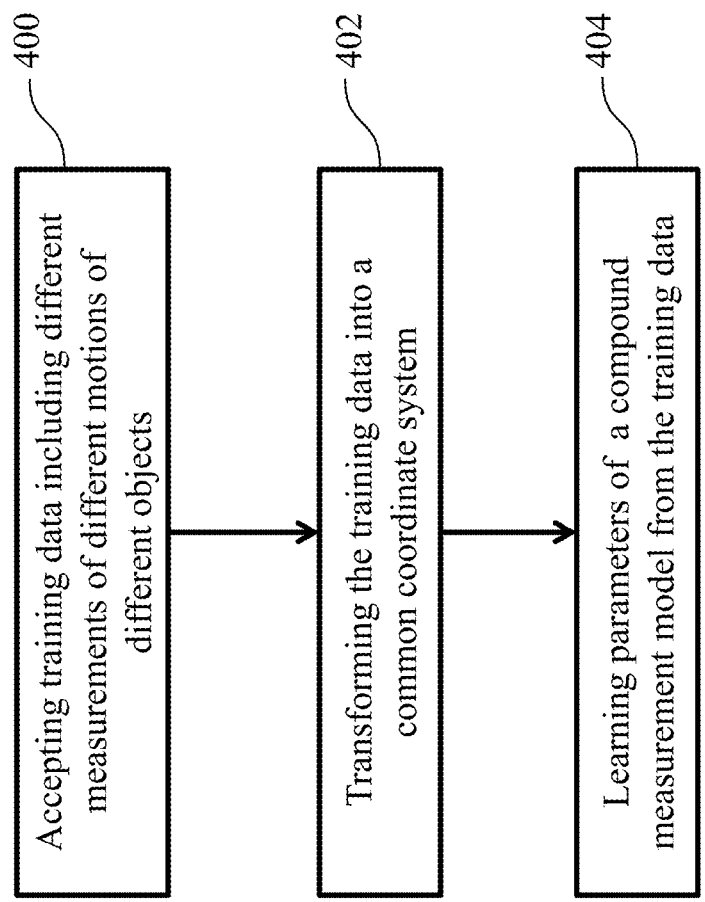
FIG. 4 shows a flow chart of a method for learning parameters of the compound measurement model, according to some embodiments.

FIG. 4 shows a flow chart of a method for learning the parameters of the compound measurement model 304, according to some embodiments. At step 400, the method includes accepting 400 training data including different measurements of different motions of different objects. At step 402, the method includes transforming 402 the training data into a common coordinate system.

Some embodiments are based on recognition that the parameters of the compound measurement model 304 can be learned offline based on the training data and knowledge of the contour of the object to be tracked using various statistical methods, such as an expectation-maximization (EM) method. To that end, at step 404, the method includes learning 404 the parameters of the compound measurement model from the training data, using the statistical method, such as the EM method.

Figure 5A:
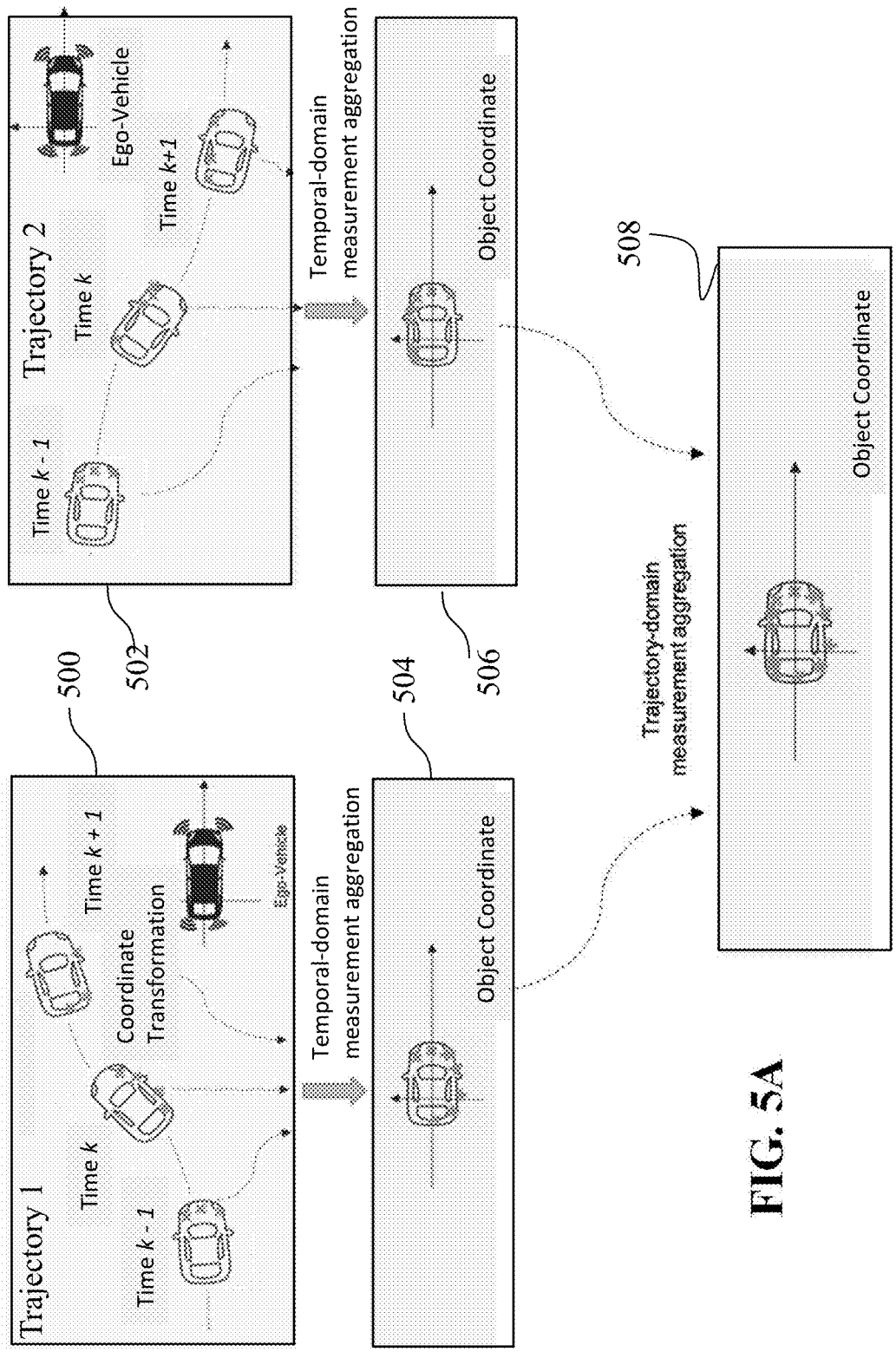
FIGS. 5A and 5B show schematics of transformation of training data collected from different motions of different objects into a common unit coordinate system, according to some embodiments.
Figure 5B:
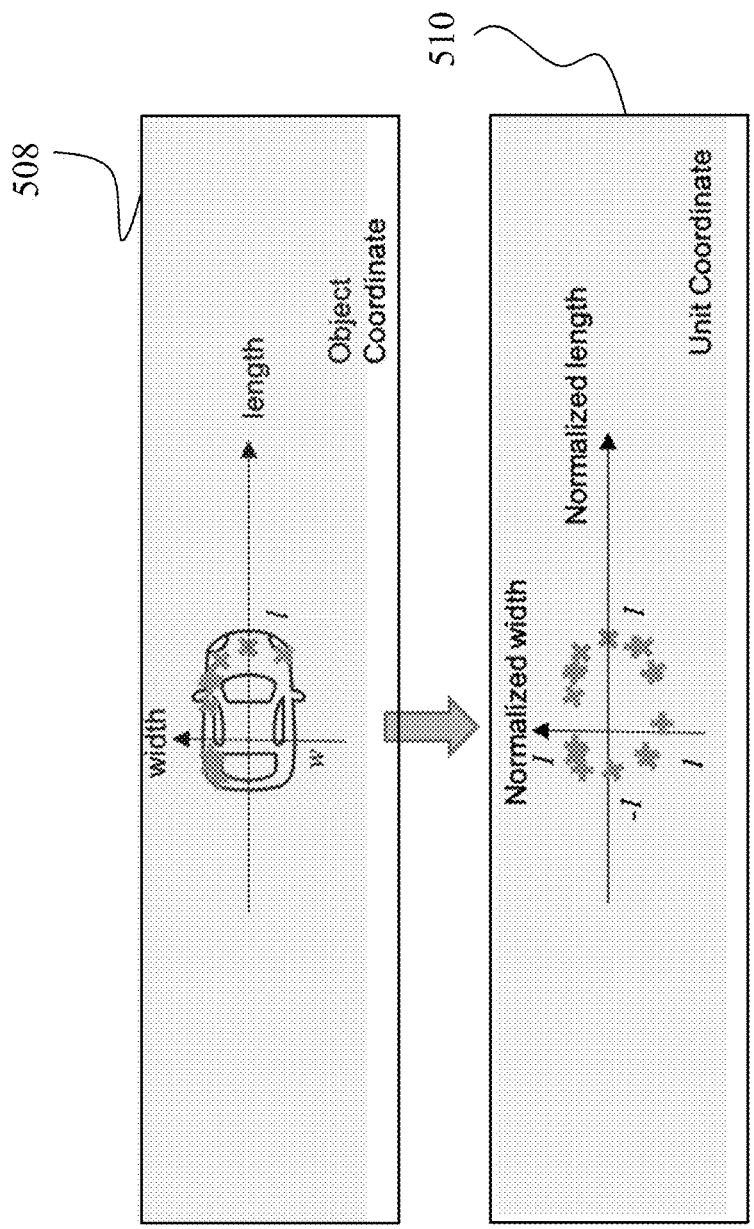

FIGS. 5A and 5B show schematics of transformation of the training data collected from different motions of different objects into the common unit coordinate system, according to some embodiments. The different measurements collected from tracking different trajectories 500 and 502 are converted into a respective object-centered (OC) coordinate system 504 and 506. Then, the converted measurements are aggregated 508. In some implementations, the measurements are collected for motion of similar type of objects, e.g., from motions of similar class of vehicles. For example, the embodiments, for each trajectory, convert the measurements from each time step from global coordinate (GC) to the object-centered (OC) coordinate, and aggregate OC measurements from all trajectories for vehicles with a similar size (e.g., sedan).

Next, as shown in FIG. 5B, the embodiments convert the aggregated OC 508 measurements to a unit coordinate (UC) system 510. In some implementations, the conversion to UC system is performed by various normalization techniques that allow using the converted training data for machine learning. Further, the measurements in the unit coordinate system 510 are used as training data for learning the parameters of the compound measurement model 304.

Figure 6:
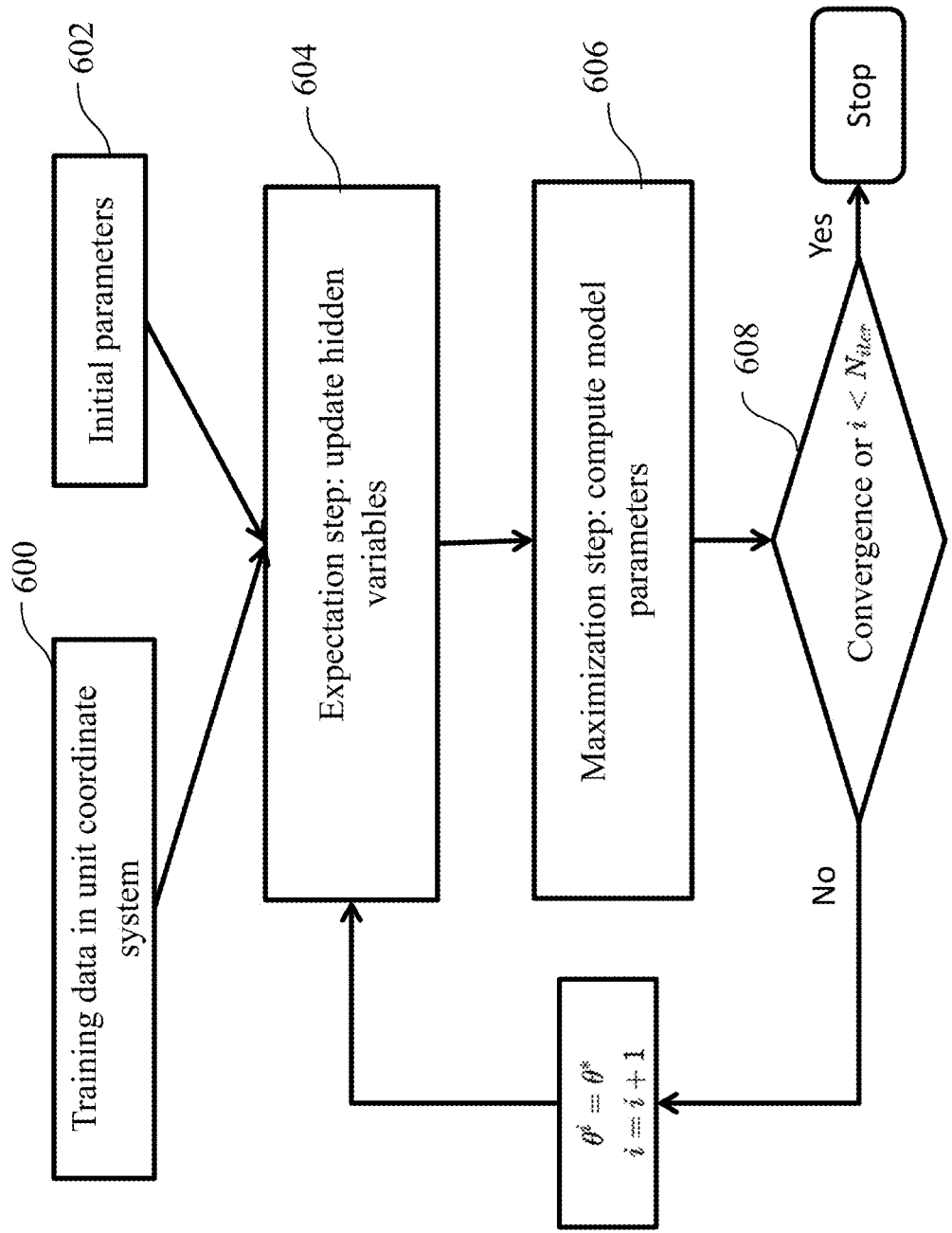
FIG. 6 shows a block diagram of an expectation-maximization (EM) method for learning the parameters of the compound measurement model, according to some embodiments.

FIG. 6 shows a block diagram of the EM method for learning the parameters of the compound measurement model 304, according to some embodiments. In some embodiments, the measurements in the unit coordinate system 510 are used as the training data 600, denoted as $Z=\{z_j\}_{i=1}^N$, for the EM method. In some other embodiments, the aggregated OC measurements 508 are received and converted into a unit coordinate system, which originates at the object center $m=[x_m, y_m] \in \mathbb{R}^{2\times 1}$ and is oriented such that x-axis points towards object's front, by applying the following coordinate transformation:

$$\bar{z}_i = S^{-1} R_\psi^{-1}(z_i - m), \tag{6}$$

where $R_\psi \in \mathbb{R}^{2\times 2}$ is a rotation matrix as a function of the orientation angle $\psi$, $S=\text{diag}(l, w)$ is a scaling matrix.

The training data 600 in the unit coordinate system, and initial parameters 602 such as a control point $p_j^0$ and extent $\Sigma_l^0$ are input data to the EM method. The EM method includes two main steps, namely, an expectation step 604 and a maximization step 606.

The expectation step 604 is to update hidden random variables $\{\phi_l, \bar{z}_l, Z_l\}$. At first, a posterior association probability of each measurement is calculated as $$\rho_i^l = \frac{\frac{1}{L} \times \mathcal{N}(\bar{z}_i; \mu_l, 4\Sigma_l)}{\frac{1}{L} \times \sum_{i=1}^L \mathcal{N}(\bar{z}_i; \mu_i, 4\Sigma_i) + \lambda}, \tag{7}$$

where $\mu_l$ are $4\Sigma_l$ are the mean and the covariance matrix of each component. Scaling factor 4 is used to approximate a uniform distribution and $\lambda$ is a probability of uniformly distributed outliers. Then, the remaining hidden variables $\bar{z}_l$, $Z_l$ can be updated using (1) and (2), respectively.

The maximization step 606 is to update the model parameters $\theta=\{p_j, \Sigma_l\}$ based on the Q-function of (5) as $$Q(\theta) \propto \sum_{l=1}^L \left\{ -\frac{\bar{N}_l}{2}(\mu_l - \bar{z}_l)^T \Sigma_l^{-1}(\mu_l - \bar{z}_l) - \frac{N_l+1}{2}\log|\Sigma_l| - \frac{1}{2}tr\left(-\frac{1}{2}Z_l\Sigma_l^{-1}\right)\right\} \tag{8}$$

The B-spline curve in a matrix-vector form can be reformatted as $\mu_l = B_l p$, where $B_l = \text{blkdiag}(n_l^T, n_l^T)$, $n_l = [B_{0,d}(r_l), \ldots B_{m,d}(r_l)]^T$ and $p=[p_x^T, p_y^T]$ with $p_x^T$ and $p_y^T$ denoting the control inputs in x and y coordinates, respectively. By setting derivative of Q ($\theta$) (with respect to $\theta$) to 0, the control input can be given as $p=H^+M$, where $H^+$ is Moore-Penrose inverse of $$H = \Sigma_{l=1}^L(\bar{N}_l B_l^T \Sigma_l^{-1} B_l) \text{ and}$$

$$M = \Sigma_{l=1}^L(\bar{N}_l B_l^T \Sigma_l^{-1} \bar{z}_l), \text{ and}$$

$$\Sigma_l = \frac{1}{\bar{N}_l+1}\left[\bar{N}_l(\bar{z}_l - \mu_l)(\bar{z}_l - \mu_l)^T + Z_l^T\right]. \tag{9}$$

Further, iterations are carried out between the estimates of p and $\Sigma_l$ until a convergence criterion 608 is achieved. The convergence criterion 608 may be a predetermined likelihood in (8), relative changes of the estimated parameters over consecutive iterations is smaller than predefined values, or a predetermined maximum number of iterations.

According to some embodiments, the offline learned compound measurement model is used for online tracking of the expanded state of the object, i.e., real time tracking of the expanded state of the object. Some embodiments are based on the realization that the probabilistic nature of the compound measurement model can be beneficially aligned with probabilistic multi-hypothesis tracking (PMHT) methods. For example, such an alignment allows implementing the probabilistic filter using at least a variation of a Kalman filter. For example, one embodiment uses an unscented Kalman filter-probabilistic multi-hypothesis tracking (UKF-PMHT) method. The unscented Kalman filter (UKF) is used for transforming the compound measurement model from the unit coordinate system into the global coordinate system. The probabilistic multi-hypothesis tracking (PMHT) method is then applied to assign the measurements at the current time step to different ellipsis components in a probabilistic fashion, and update the expanded state of the object.

In an embodiment, given the offline learned compound measurement model and assuming a measurement $x_\mu$ in the unit coordinate system is distributed with respect to the l-th ellipse $\mathcal{N}(\mu_l, \Sigma_l)$, the corresponding measurement $h_{l,k}(x_{k|k-1})$ in the global coordinate system is defined as $$h_{l,k}(x_{k|k-1}) = m_{k|k-1} + R_{\psi k|k-1} \cdot S_{k|k-1} \cdot x_\mu \tag{10}$$

where $m_{\psi k|k-1}$, $R_{\psi k|k-1}$ and $s=\text{diag}(l_{k|k-1}, w_{k|k-1})$ are defined the same way as (6) except that all augments are given by the predicted state (k|k−1) with corresponding predictive distributions (e.g., the Gaussian distribution).

Some embodiments are based on realization that since the transformation in (10) is nonlinear, particularly with respect to the predictive orientation angle, an unscented transform (UT) can be used to determine a mean $\overline{h}_{l,k}(x_{k|k-1})$ and a covariance matrix $X_l$ of $h_{l,k}(x_{k|k-1})$. To this end, the predicted expanded state is augmented with $x_\mu$ as $x_{aug}=[x_{k|k-1}, x_\mu]^T$ $\mathbb{R}^{n_a \times 1}$ with $n_a=9$. Then, $2n_a+1$ weighted samples, i.e., the sigma points, are determined such that they can describe a true mean $\overline{x}_{aug}$ and a covariance matrix $P_{aug}$ of $x_{aug}$:

$$\mathcal{A}_0 = \overline{x}_{aug}, \quad \mathcal{W}_0 = \kappa/(n_a+\kappa), \quad \mathcal{W}_{i \geq 1} = 0.5/(n_a+\kappa),$$

$$\mathcal{A}_{i \leq n_a} = \overline{x}_{aug} + (\sqrt{(n_a+\kappa)P_{aug}})_i, \qquad (11)$$

$$\mathcal{A}_{i \leq n_a} = \overline{x}_{aug} - (\sqrt{(n_a+\kappa)P_{aug}})_{i-n_a}, \qquad (12)$$

where $\kappa$ is a scaling parameter such that $\kappa+n_a \neq 0$ and $(\sqrt{A})_i$ denotes i-th row of matrix square root of A. Each sigma point is then propagated through the nonlinear function of (10), i.e., $\mathcal{B}_i = h_{l,k}(\mathcal{A}_i)$, and a first two moments of $h_{l,k}(x_{k|k-1})$ are computed as $$\overline{h}_{l,k} = \sum_{i=0}^{2n_a} \mathcal{W}_i \mathcal{B}_i, \qquad (13)$$

$$X_l = \sum_{i=0}^{n_a} \mathcal{W}_i (\mathcal{B}_i - \overline{h}_{l,k})(\mathcal{B}_i - \overline{h}_{l,k})^T. \qquad (14)$$

In the global coordinate system, a measurement $z_l$ that is assigned to the l-th ellipse can be defined as $$z_l = h_{l,k}(x_{k|k-1}) + n_l, \qquad (15)$$

where $h_{l,k}(x_{k|k-1}) \sim \mathcal{N}(\overline{h}_{l,k}, X_l)$, is a corresponding reflection center, and $n_l \sim \mathcal{N}(0, R)$ is a measurement noise.

Given measurements at time k, $Z_k = \{z_{i,k}\}_{i=1}^{N_k}$ and L offline learned $\{h_{l,k}(x_{k|k-1})\}_{i=1}^L$ obtained at time step k, the PMHT is used to assign the measurements to each ellipse component. Different from a general PMHT algorithm to handle measurement-to-object association and update the kinematic states of multiple objects over consecutive time steps, the PMHT algorithm here is applied to handle the measurement-to-ellipsis association and update both kinematic and extent states of a single object over the current time step k. Specifically, the PMHT employs the EM algorithm for a soft measurement-to-ellipsis assignment that in turns creates a synthetic measurement for each component. Mathematically, the measurement-to-ellipsis association weights $\rho_{i,k}^l$, synthetic measurements $\overline{z}_{l,k}$ and corresponding synthetic covariance matrix $C_{zz}$ are derived as follows $$\rho_{i,k}^l = \frac{\mathcal{N}(z_{i,k}; \overline{h}_{l,k}(x_{k|k-1}), 4X_{l,k}+R)}{\sum_{i=1}^{L_k} \mathcal{N}(z_{i,k}; \overline{h}_{l,k}(x_{k|k-1}), 4X_{l,k}+R)}, \qquad (16)$$

$$\overline{z}_{l,k} = \frac{\sum_{i=1}^{N_k} \rho_{i,k}^l z_{i,k}}{\sum_{i=1}^{N_k} \rho_{i,k}^l}, \qquad (17)$$

$$C_{xz} = 4X_{l,k} + \frac{R}{\sum_{i=1}^{N_k} \rho_{i,k}^l}. \qquad (18)$$

Further, a covariance between the expanded state and measurements $C_{xz}$ is calculated during the UT procedure (10) and the filter gain is calculated as $K=C_{xz}C_{zz}^{-1}$. The expanded state $x_{k,l}$ and the covariance matrix $C_{l,n}$ are updated based on the l-th measurement equation in (15). The PMHT iterates between the expectation and maximization steps until a predefined maximum iteration number $N_{iter}$ is reached. In each iteration n, the expanded state $x_{k,l}$ and the covariance matrix $C_{l,n}$ are updated incrementally by each component (i.e., over l) in order of (10) and (16)-(18). An overall UKF-PMHT tracking algorithm is described below.

Figure 7A:
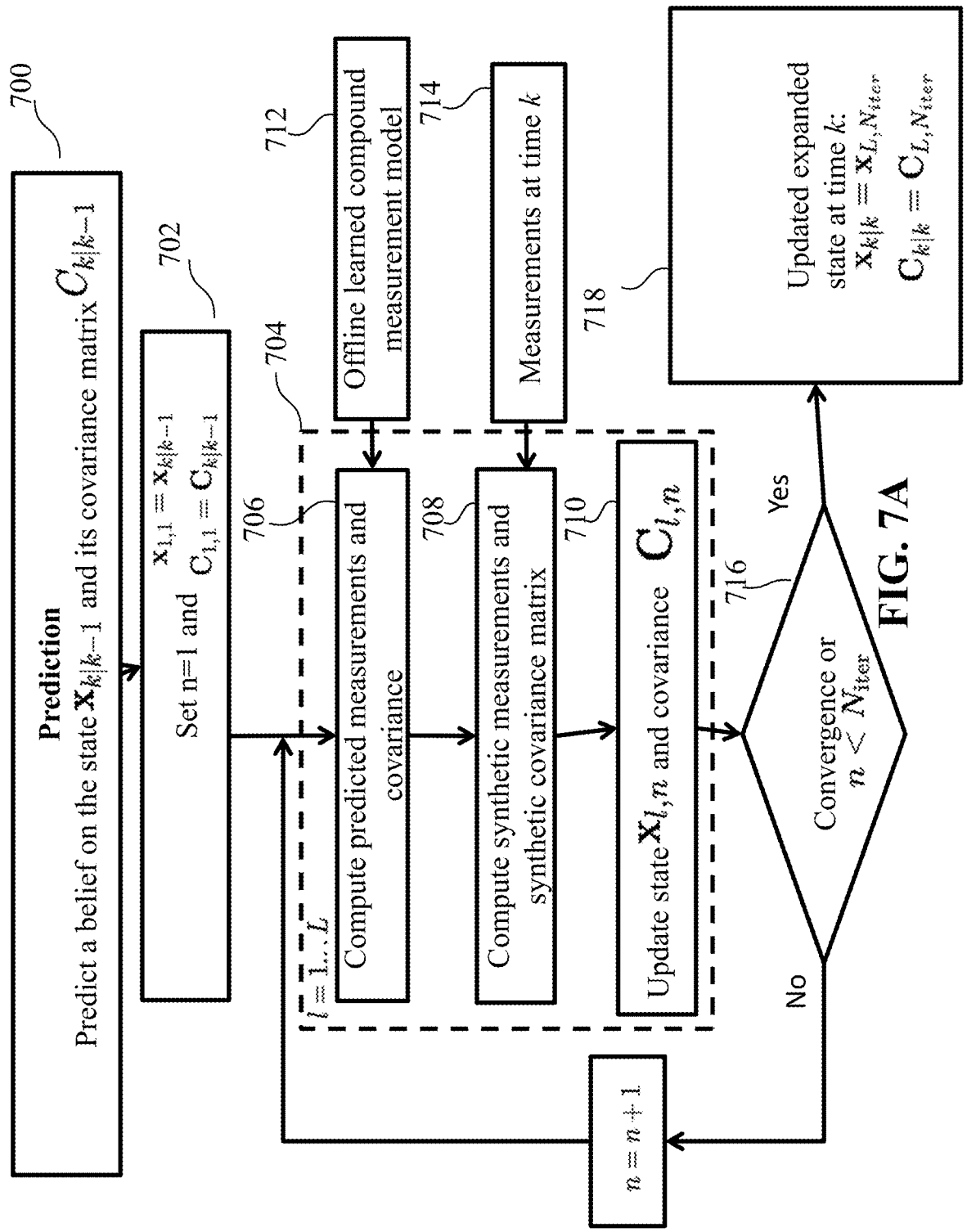
FIG. 7A shows a flowchart of an unscented Kalman filter-probabilistic multi-hypothesis tracking (UKF-PMHT) algorithm, according to some embodiments.

FIG. 7A shows a flowchart of the UKF-PMHT tracking algorithm, according to some embodiments. The UKF-PMHT tracking algorithm is executed by the processor 204. The UKF-PMHT tracking algorithm includes two stages, namely, a prediction stage 700 and an update stage 704. In the prediction stage 700, a belief on the expanded state of the object and a corresponding covariance matrix is predicted using the motion model. Further, at block 702, an iteration of the update stage 704 is initiated by setting an iteration index n=1, and $x_{1,1}=x_{k|k-1}$ and $C_{1,1}=C_{k|k-1}$.

Figure 7B:
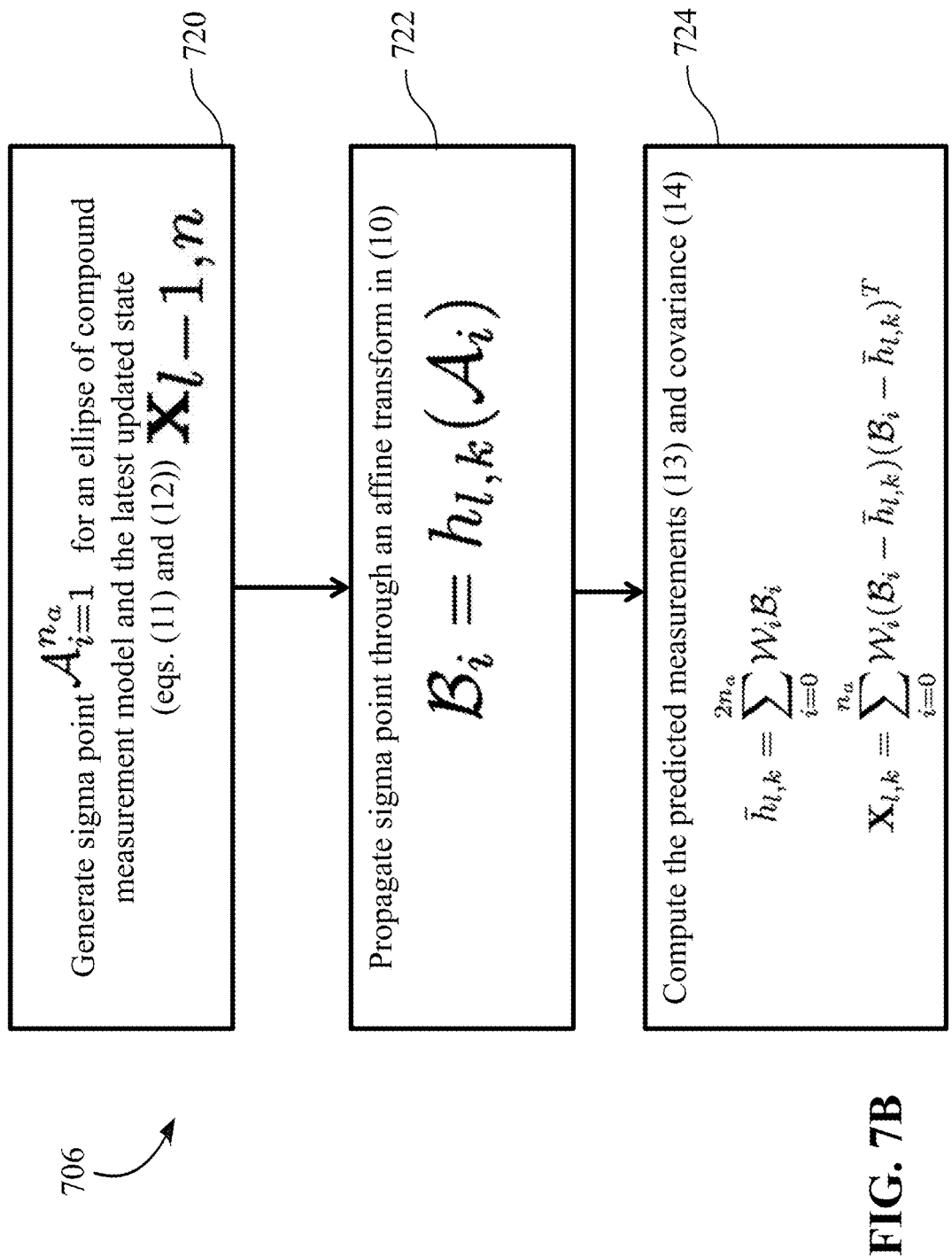
FIG. 7B shows a block diagram of steps performed to compute predicted measurements and a covariance matrix, according to some embodiments.

At block 706 of the update stage 704, the predicted measurements and the covariance matrix are computed based on an offline learned measurement model 712. FIG. 7B shows a block diagram of steps performed to compute the predicted measurements and the covariance matrix, according to some embodiments. At block 720, the sigma points $\mathcal{A}_{i=1}^{n_a}$ are generated for a first ellipse (i.e., l=1) of the compound measurement model 712 and the latest updated expanded state, using equations (11) and (12). At block 722, the sigma points are propagated through an affine transform given by (10). At block 724, the predicted measurements and the covariance matrix are computed according to equations (13) and (14), respectively, for the first ellipse.

Figure 7C:
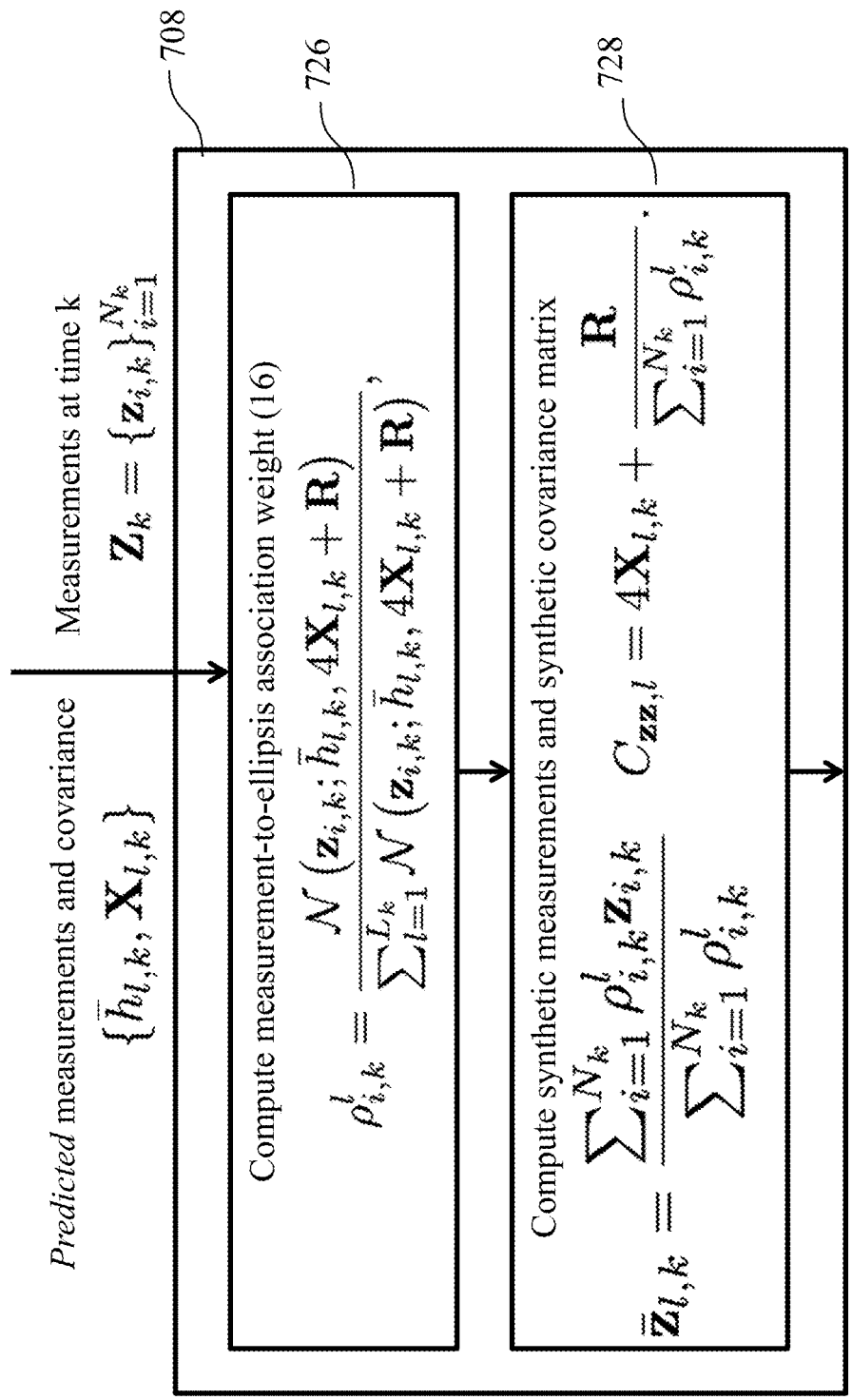
FIG. 7C shows a block diagram of steps performed to compute synthetic measurements and a synthetic covariance matrix, according to some embodiments.

Referring back to FIG. 7A, at block 708, given measurements 714 at time k, the synthetic measurements and the synthetic covariance matrix are computed. FIG. 7C shows a block diagram of steps performed to compute the synthetic measurements and the synthetic covariance matrix, according to some embodiments. At block 726, the measurements-to-ellipse association weight is computed according to equation (16) for the first ellipse. At block 728, the synthetic measurements and the synthetic covariance matrix are computed using equations (17) and (18), respectively, for the first ellipse.

Figure 7D:
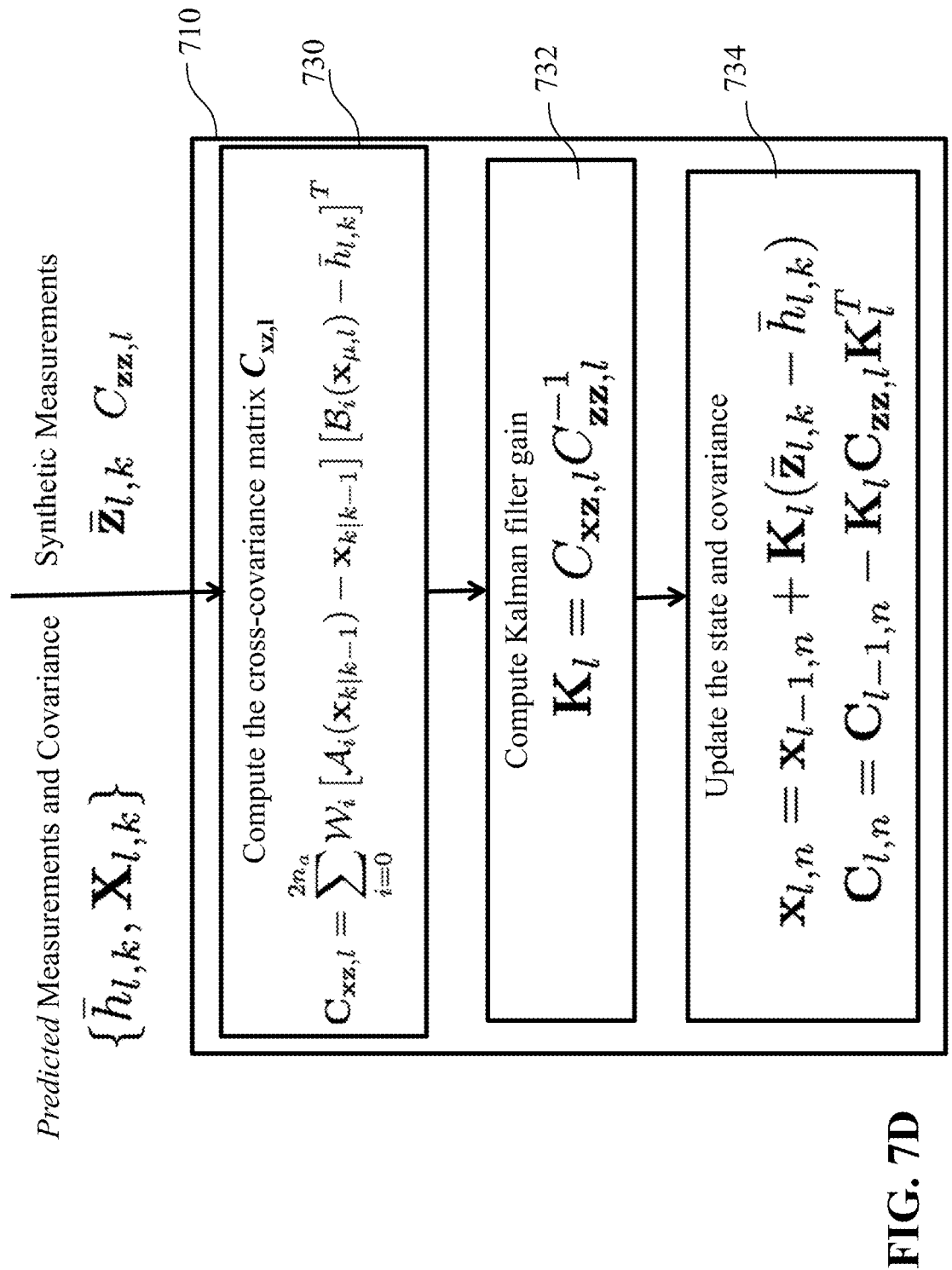
FIG. 7D shows a block diagram of steps performed to update the expanded state and a covariance matrix, according to some embodiments.

Referring back to FIG. 7A, at block 710, the expanded state $x_{l,n}$ and the covariance matrix $C_{l,n}$ are updated. Here, subscript l is an ellipse index. FIG. 7D shows a block diagram of steps performed to update the expanded state $x_{l,n}$ and the covariance matrix $C_{l,n}$ for the first ellipse (i.e., l=1), according to some embodiments. At block 730, the cross-covariance matrix is computed as $$C_{xz,l} = \sum_{i=0}^{2n_a} W_i [A_i(x_{k|k-1}) - x_{k|k-1}][B_i(x_{\mu,l}) - \overline{h}_{l,k}]^T.$$

At block 732, a Kalman filter gain is computed. The Kalman filter gain is given by $$K_l = C_{xz,l} C_{zz,l}^{-1}.$$

At block 734, the expanded state $x_{l,n}$ and the covariance matrix $C_{l,n}$ are updated as $$x_{l,n} = x_{l-1,n} + K_l(\overline{z}_{l,k} - \overline{h}_{l,k})$$

$$C_{l,n} = C_{l-1,n} - K_l C_{zz,l} K_l^T$$

Further, the same functions given at the blocks 706, 708, and 710 are executed for a second ellipse (i.e., l=2) of the compound measurement model 712. For the second ellipse, the updated expanded state $x_{l,n}$ and the covariance matrix $C_{l,n}$ are used to compute the predicted measurements and the covariance matrix. In other words, the predicted measurements and the covariance matrix are computed using the latest updated expanded state and the covariance matrix.

Likewise, the same functions given at the blocks 706, 708, and 710 are executed for the rest of ellipses of the compound measurement model 712. To that end, to complete an iteration of the update stage 704, a number of internal iterations l=1 . . . L, where L is a number of ellipses of the compound measurement model 712, are executed. The complete execution of the iteration (n=1) of the update stage 704 yields an expanded state of the object at time k. Further, in the next iteration (i.e., n=2), the update stage 704 is executed to yield an updated expanded state. The update stage 704 is iteratively executed until a convergence criterion 716 is achieved. The convergence criterion 710 may be a predetermined maximum number of iterations $N_{iter}$. Once the convergence criterion 716 is achieved, an updated expanded state $$x_{k|k} = x_{L,N_{iter}}$$

and a corresponding covariance matrix $$C_{k|k} = C_{L,N_{iter}}$$

are outputted 718.

Figure 8A:
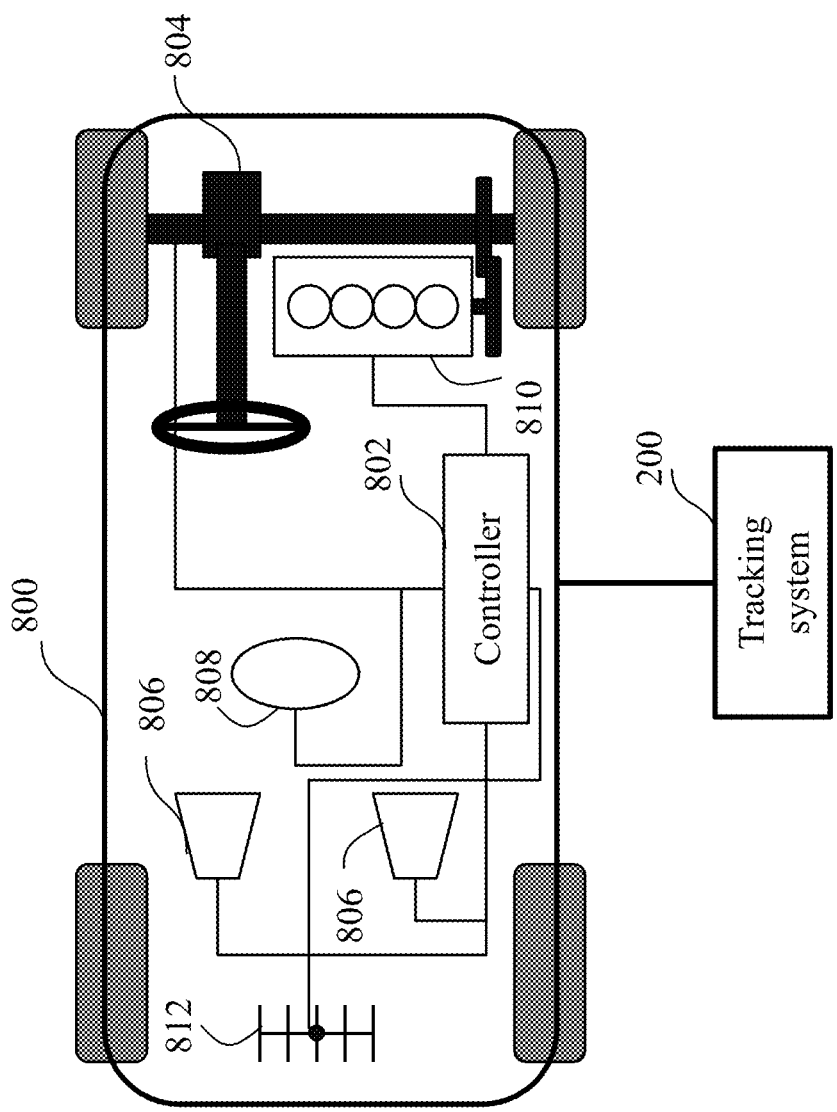
FIG. 8A shows a schematic of a vehicle including a controller in communication with the system employing principles of some embodiments.

FIG. 8A shows a schematic of a vehicle 800 including a controller 802 in communication with the tracking system 200 employing principles of some embodiments. The vehicle 800 may be any type of wheeled vehicle, such as a passenger car, bus, or rover. Also, the vehicle 800 can be an autonomous or semi-autonomous vehicle. For example, some embodiments control the motion of the vehicle 800. Examples of the motion include lateral motion of the vehicle controlled by a steering system 804 of the vehicle 800. In one embodiment, the steering system 804 is controlled by the controller 802. Additionally or alternatively, the steering system 804 may be controlled by a driver of the vehicle 800.

In some embodiments, the vehicle may include an engine 810, which can be controlled by the controller 802 or by other components of the vehicle 800. In some embodiments, the vehicle may include an electric motor in place of the engine 810 and can be controlled by the controller 802 or by other components of the vehicle 800. The vehicle can also include one or more sensors 806 to sense the surrounding environment. Examples of the sensors 806 include distance range finders, such as radars. In some embodiments, the vehicle 800 includes one or more sensors 808 to sense its current motion parameters and internal status. Examples of the one or more sensors 808 include global positioning system (GPS), accelerometers, inertial measurement units, gyroscopes, shaft rotational sensors, torque sensors, deflection sensors, pressure sensor, and flow sensors. The sensors provide information to the controller 802. The vehicle may be equipped with a transceiver 812 enabling communication capabilities of the controller 802 through wired or wireless communication channels with the tracking system 200 of some embodiments. For example, through the transceiver 812, the controller 802 receives the control inputs from the tracking system 200.

Figure 8B:
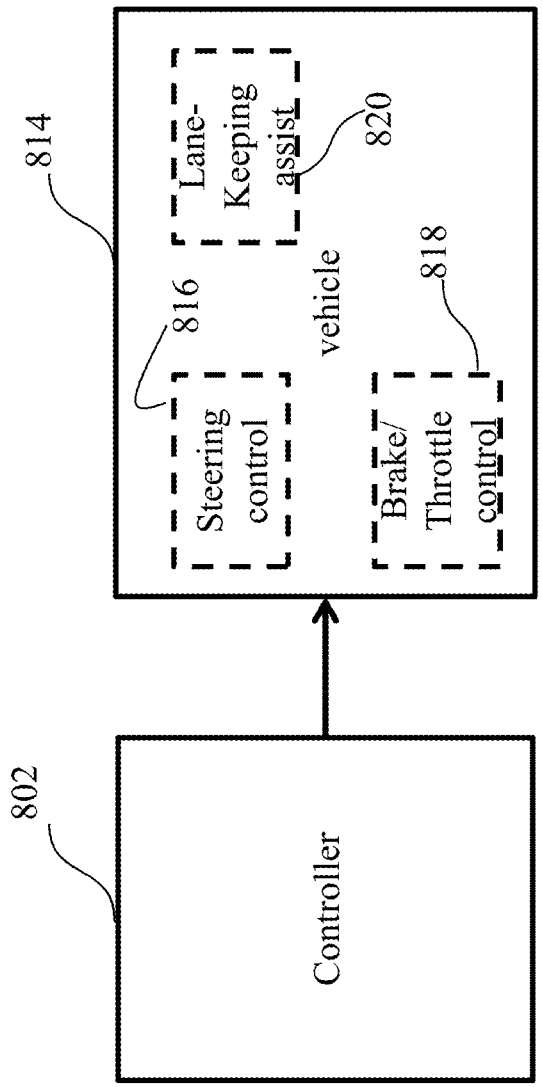
FIG. 8B shows a schematic of interaction between the controller of the system of FIG. 8A and controllers of the vehicle, according to some embodiments.

FIG. 8B shows a schematic of interaction between the controller 802 and controllers 814 of the vehicle 800, according to some embodiments. For example, in some embodiments, the controllers 814 of the vehicle 800 are steering control 816 and brake/throttle controllers 818 that control rotation and acceleration of the vehicle 800. In such a case, the controller 802 outputs control commands, based on the control inputs, to the controllers 816 and 818 to control the kinematic state of the vehicle. In some embodiments, the controllers 814 also includes high-level controllers, e.g. a lane-keeping assist controller 820 that further process the control commands of the controller 802. In both cases, the controllers 814 utilize the output of the controller 802 i.e. control commands to control at least one actuator of the vehicle, such as the steering wheel and/or the brakes of the vehicle, in order to control the motion of the vehicle.

Figure 8C:
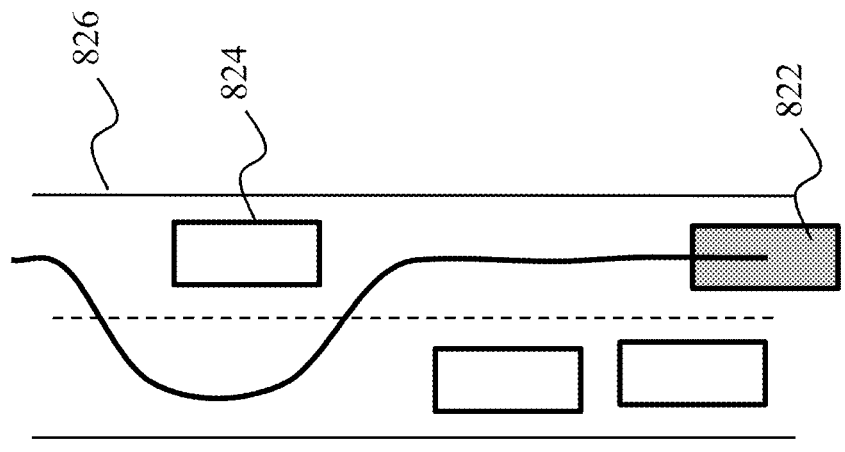
FIG. 8C shows a schematic of an autonomous or semi-autonomous controlled vehicle for which control inputs are generated by using some embodiments.

FIG. 8C shows a schematic of an autonomous or semi-autonomous controlled vehicle 822 for which the control inputs are generated by using some embodiments. The controlled vehicle 822 may be equipped with the tracking system 200. In some embodiments, an expanded state of each of the obstacles 824 are tracked by the controlled vehicle 822 and subsequently, the control inputs are generated based on the tracked expanded states of the obstacles. In some embodiments, the control inputs include commands specifying values of one or combination of a steering angle of the wheels of the vehicle and a rotational velocity of the wheels, and the measurements include values of one or combination of a rotation rate of the vehicle and an acceleration of the vehicle.

The generated control inputs aim to keep the controlled vehicle 822 within particular bounds of road 826, and aims to avoid other uncontrolled vehicles, i.e., obstacles 824 for the controlled vehicle 822. For example, based on the control inputs, the autonomous or semi-autonomous controlled vehicle 822 may, for example, pass another vehicle on the left or on the right side or instead to stay behind another vehicle within the current lane of the road 826.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A tracking system for tracking an expanded state of an object, the expanded state including a kinematic state indicative of one or a combination of a position and a velocity of a center of the object, and an extended state indicative of one or a combination of a dimension and an orientation of the object, the tracking system comprising:
at least one processor; and
a memory having instructions stored thereon that, when executed by the at least one processor, cause the tracking system to:
receive measurements associated with at least one sensor, wherein the at least one sensor is configured to probe a scene including the object via one or multiple signal transmissions, the one or multiple signal transmissions configured to produce one or multiple measurements of the object per the transmission;
execute a probabilistic filter iteratively tracking a belief on the expanded state of the object, wherein the belief is predicted using a motion model of the object and is updated using a compound measurement model of the object, wherein the compound measurement model includes multiple probabilistic distributions constrained to lie on a contour of the object with a predetermined relative geometrical mapping to the center of the object, wherein in each iteration of the iterative tracking, the belief on the expanded state is updated based on a difference between a predicted belief and an updated belief, wherein the updated belief is estimated based on probabilities of the measurements fitting each of the multiple probabilistic distributions, and mapped to the expanded state of the object based on the corresponding geometrical mapping; and
track the expanded state of the object based on the updated belief on the expanded state, wherein the processor is configured to determine a control input to a controller of a vehicle based on the tracked expanded state of the object, and control a vehicle according to the control input.

2. The tracking system of claim 1, wherein the processor is further configured to transform the compound measurement model from a unit coordinate system to a global coordinate system with respect to the predicted belief or iteratively updated belief on the expanded state, based on an unscented transform function.

3. The tracking system of claim 1, wherein the processor is further configured to assign the multiple measurements to different probabilistic distributions of the multiple probabilistic distributions by treating the different probabilistic distributions as belonging to different objects.

4. The tracking system of claim 3, wherein the processor is further configured to assign the multiple measurements to the different probabilistic distributions using probabilistic multiple-hypothesis tracking (PMHT) for performing the assigning of the multiple measurements to the different probabilistic distributions treated as the different objects.

5. The tracking system of claim 1, wherein the compound measurement model is learned based on an expectation-maximization (EM) method.

6. The tracking system of claim 1, wherein one or more parameters of each probabilistic distribution are represented by a random matrix model (RMM) in a two-dimensional (2D) probability space.

7. The tracking system of claim 1, wherein the contour of the object corresponds to a B-spline curve.

8. The tracking system of claim 1, wherein the predicted belief on the state of the vehicle is used to align the compound measurements model with the measurements using an unscented transformation.

9. A tracking method for tracking an expanded state of an object, wherein the expanded state includes a kinematic state indicative of one or a combination of a position and a velocity of a center of the object and an extended state indicative of one or a combination of a dimension and an orientation of the object, the method comprising:
receiving measurements associated with at least one sensor, wherein the at least one sensor is configured to probe a scene including the object with one or multiple signal transmissions to produce one or multiple measurements of the object per the transmission;
executing a probabilistic filter iteratively tracking a belief on the expanded state of the object, wherein the belief is predicted using a motion model of the object and is updated using a compound measurement model of the object, wherein the compound measurement model includes multiple probabilistic distributions constrained to lie on a contour of the object with a predetermined relative geometrical mapping to the center of the object, wherein in each iteration of the iterative tracking, the belief on the expanded state is updated based on a difference between a predicted belief and an updated belief, wherein the updated belief is estimated based on probabilities of the measurements fitting each of the multiple probabilistic distributions, and mapped to the expanded state of the object based on the corresponding geometrical mapping; and tracking the expanded state of the object based on the updated belief on the expanded state, wherein a processor is configured to determine a control input to a controller of a vehicle based on the tracked expanded state of the object, and control a vehicle according to the control input.

10. The tracking method of claim 9, wherein the contour of the object corresponds to a B-spline curve.

11. The tracking method of claim 9, wherein the tracking method further comprises transforming the compound measurement model from a unit coordinate system to a global coordinate system with respect to the predicted belief on expanded state, based on an unscented transform function.

12. The tracking method of claim 9, wherein the tracking method further comprises assigning the multiple measurements to different probabilistic distributions of the multiple probabilistic distributions independently from each other by treating the different probabilistic distributions as belonging to different objects.

13. The tracking method of claim 12, wherein the tracking method further comprises assigning the multiple measurements to the different probabilistic distributions using probabilistic multiple-hypothesis tracking (PMHT) performing the assigning of the multiple measurements to the different probabilistic distributions treated as different objects.

14. The tracking method of claim 9, wherein the compound measurement model is learned based on an expectation-maximization (EM) method.

15. The tracking method of claim 9, wherein one or more parameters of each probabilistic distribution are represented by a random matrix model (RMM) in a two-dimensional (2D) probability space.

16. A non-transitory computer-readable storage medium embodied thereon a program executable by a processor for performing a method for tracking an expanded state of an object, wherein the expanded state includes a kinematic state indicative of one or a combination of a position and a velocity of a center of the object and an extended state indicative of one or a combination of a dimension and an orientation of the object, the method comprising:

receiving measurements associated with at least one sensor, wherein the at least one sensor is configured to probe a scene including the object with one or multiple signal transmissions to produce one or multiple measurements of the object per the transmission;

executing a probabilistic filter iteratively tracking a belief on the expanded state of the object, wherein the belief is predicted using a motion model of the object and is updated using a compound measurement model of the object, wherein the compound measurement model includes multiple probabilistic distributions constrained to lie on a contour of the object with a predetermined relative geometrical mapping to the center of the object, wherein in each iteration of the iterative tracking, the belief on the expanded state is updated based on a difference between a predicted belief and an updated belief, wherein the updated belief is estimated based on probabilities of the measurements fitting each of the multiple probabilistic distributions and mapped to the expanded state of the object based on the corresponding geometrical mapping; and tracking the expanded state of the object based on the updated belief on the expanded state, wherein the processor is configured to determine a control input to a controller of a vehicle based on the tracked expanded state of the object, and control the vehicle according to the control input.

* * * * *